(12) United States Patent
Seki

(10) Patent No.: US 9,222,646 B2
(45) Date of Patent: Dec. 29, 2015

(54) LUMINOUS FLUX CONTROL MEMBER, LIGHT EMITTING APPARATUS, AND ILLUMINATING APPARATUS

(71) Applicant: Enplas Corporation, Saitama (JP)

(72) Inventor: Akinobu Seki, Saitama (JP)

(73) Assignee: ENPLAS Corporation, Saitama (JP)

( * ) Notice: Subject to any disclaimer, the term of this patent is extended or adjusted under 35 U.S.C. 154(b) by 81 days.

(21) Appl. No.: 14/353,301

(22) PCT Filed: Sep. 25, 2012

(86) PCT No.: PCT/JP2012/006092
§ 371 (c)(1),
(2) Date: Apr. 22, 2014

(87) PCT Pub. No.: WO2013/061509
PCT Pub. Date: May 2, 2013

(65) Prior Publication Data
US 2014/0313734 A1     Oct. 23, 2014

(30) Foreign Application Priority Data

Oct. 28, 2011 (JP) .................................. 2011-237174
Mar. 21, 2012 (JP) .................................. 2012-063533

(51) Int. Cl.
*F21V 7/00* (2006.01)
*G02B 3/06* (2006.01)
*G02B 3/08* (2006.01)
*G02B 19/00* (2006.01)

(52) U.S. Cl.
CPC ................. *F21V 7/0091* (2013.01); *G02B 3/06* (2013.01); *G02B 3/08* (2013.01); *G02B 19/0028* (2013.01); *G02B 19/0061* (2013.01)

(58) Field of Classification Search
CPC ........... F21V 7/0091; G02B 3/06; G02B 3/08
See application file for complete search history.

(56) References Cited

U.S. PATENT DOCUMENTS

2011/0255291 A1   10/2011   Seki et al.
2012/0057101 A1    3/2012   Iiyama et al.

FOREIGN PATENT DOCUMENTS

| | | |
|---|---|---|
| CN | 102207277 A | 10/2011 |
| JP | 2005-093622 A | 4/2005 |
| JP | 2005-268166 A | 9/2005 |
| JP | 1271799 S | 5/2006 |
| JP | 2010-251073 A | 11/2010 |
| WO | 2011/114608 A1 | 9/2011 |

*Primary Examiner* — Elmito Breval
(74) *Attorney, Agent, or Firm* — Brundidge & Stanger, P.C.

(57) ABSTRACT

A luminous flux control member (120) has: a light input surface (121) having inputted thereto light that has been outputted from a light emitting element (110); a total reflecting surface (122) which totally reflects a part of the light inputted from the light input surface (121); and a light output surface (123), which outputs a part of the light inputted from the light input surface (121), and the light reflected by the total reflecting surface (122). The light output surface (123) of the luminous flux control member (120) has a substantially toroidal shape or a saddle-like shape.

10 Claims, 25 Drawing Sheets

LUMINOUS FLUX CONTROL MEMBER, LIGHT EMITTING APPARATUS, AND ILLUMINATING APPARATUS

TECHNICAL FIELD

The present invention relates to a light flux controlling member that controls a distribution of light emitted from a light emitting element. In addition, the present invention relates to a light emitting device having the light flux controlling member, and a lighting apparatus having the light emitting device.

BACKGROUND ART

An internal illumination signboard is a signboard in which a light source is disposed such that the signboard itself emits light. Because of their excellent advertising effect, internal illumination signboards are used in various places.

In recent years, light-emitting diodes (LEDs) have been increasingly used as the light source of internal illumination signboards. Light-emitting diodes have excellent characteristics such as their small size, good power efficiency, capability of emitting light of brilliant colors, reduced risk of blowout, excellent initial drive characteristics, invulnerability to vibration, and invulnerability to repetitive switching between on and off.

The direction of the light emitted from a light-emitting diode is not controlled, and therefore, when the light emitted from the light-emitting diode is used as it is, the light is expanded and cannot efficiently illuminate the surface to be illuminated. For the purpose of controlling the direction of the light emitted from a light-emitting diode, a light source including the combination of a light-emitting diode and a lens has been proposed (see, for example, PTLs 1 and 2).

PTL 1 discloses a lens for a light-emitting diode that has an emission surface rotationally symmetrical (circularly symmetrical) about the optical axis of the light-emitting diode. PTL 2 discloses a lens for a light-emitting diode that has an emission surface of a substantially cylindrical form (which has a curvature on the first side thereof, and has no curvature on the second side orthogonal to the first side).

CITATION LIST

Patent Literature

PTL 1
Japanese Patent Application Laid-Open No. 2005-268166
PTL 2
Japanese Design Registration No. 1271799

SUMMARY OF INVENTION

Technical Problem

From the perspective of arrangement of light sources, internal illumination signboards can be roughly categorized into the direct-type and the edge-lit type. FIG. 1A is a perspective view illustrating an exemplary direct-type internal illumination signboard, and FIG. 1B is a perspective view illustrating an exemplary edge-lit type hollow internal illumination signboard. As illustrated in FIG. 1A, in the case of the direct type, light emitting devices 20 (light source) are disposed on the rear side of illumination surface (display surface) 10. On the other hand, as illustrated in FIG. 1B, in the case of the edge-lit type, light emitting devices 20 are disposed at outer periphery portions of a signboard. The edge-lit type hollow internal illumination signboards are superior to the direct-type internal illumination signboards in that the structure can be simplified.

FIG. 2 is a perspective view illustrating an exemplary edge-lit type hollow internal illumination signboard. A plurality of light emitting devices 20 are disposed on base plate 30 so as to be aligned with a straight line in parallel with illumination surface 10. In FIG. 2, the x axis is an axis along which light emitting devices 20 are arranged. The y axis is an axis in parallel with base plate 30 and perpendicular to the x axis. The z axis is an axis perpendicular to base plate 30 and in parallel with the central axis of light emitting device 20. Illumination surface 10 is in parallel with the xz plane.

In the case of the edge-lit type hollow internal illumination signboard illustrated in FIG. 2, when a light emitting device composed of a combination of a light-emitting diode and an existing lens for a light-emitting diode is used as a light source, uneven illuminance is easily caused on the illuminated surface.

For example, in a light emitting device including a lens having an emission surface rotationally symmetrical (circularly symmetrical) about the optical axis of the light-emitting diode as disclosed in PTL 1, the light-collecting power is the same in all 360 degrees about central axis CA of the light emitting device. For this reason, even when the light-collecting power in the y-axis direction illustrated in FIG. 2 is appropriate, the light-collecting power in the x-axis direction may be excessively strong in some cases. In such case, as illustrated in FIG. 3A, bright site 40 (bright region) is formed on the illuminated surface at a position near the light emitting device in the z-axis direction, and near central axis CA of the light emitting device in the x-axis direction. It is to be noted that, in FIG. 3A and in FIG. 3B, regions illuminated by light are illustrated in white to black, and regions that appear bright because the amount of light applied thereto is particularly larger than the other regions are illustrated in black.

On the other hand, in the case of a light emitting device having a lens having an emission surface of a substantially cylindrical form as disclosed in PTL 2, when the unit is disposed in such a manner that a direction of an emission surface which has no curvature is in parallel with the x axis (surface to be illuminated), light can be expanded in the x-axis direction to prevent a dark site from being formed on the illuminated surface. The lens having the emission surface of the substantially cylindrical form, however, cannot control the light distribution in the x-axis direction in accordance with the interval between light emitting devices. For this reason, as illustrated in FIG. 3B, shining site 50 (excessively bright region) is easily formed on illumination surface 10 in regions between light emitting devices 20.

As described, there has been a problem that when a light emitting device having a light emitting element (light-emitting diode) and an existing light flux controlling member (lens) is used as a light source of an edge-lit type hollow internal illumination signboard, uneven illuminance is easily caused on the illuminated surface.

An object of the present invention is to provide a light flux controlling member used in a light emitting device, which light flux controlling member has different light-collecting powers which differ depending on the directions about the central axis (optical axis) of the light emitting device so that a surface to be illuminated disposed substantially in parallel with the central axis (optical axis) of the light emitting device can be uniformly illuminated. Another object of the present invention is to provide a light emitting device having the light flux controlling member, and a lighting apparatus having the light emitting device.

Solution to Problem

A light flux controlling member according to an embodiment of the present invention controls a distribution of light emitted from a light emitting element, and includes: an incidence surface on which light emitted from the light emitting element is incident; a total reflection surface that totally reflects part of the light incident on the incidence surface; and an emission surface that emits the part of the light incident on the incidence surface and the light reflected by the total reflection surface, wherein the incidence surface is so formed as to face the light emitting element and to intersect with a central axis of the light flux controlling member, the emission surface is so formed as to face away from the incidence surface and to intersect with the central axis of the light flux controlling member, the total reflection surface is so formed as to surround the central axis of the light flux controlling member and to have a diameter that gradually increases from a side of the incidence surface toward a side of the emission surface, and, when the light flux controlling member is disposed in a three-dimensional orthogonal coordinate system in such a manner that a light emission center of the light emitting element is located at an origin, that the central axis of the light flux controlling member corresponds to a z axis, and that a direction in which light travels from the light emission center of the light emitting element toward the emission surface is a forward direction of the z axis, the emission surface satisfies the following Expression (1) and Expression (2)

$$\Delta Z_1 > \Delta Z_2 \quad (1)$$

$$\Delta Z_2 \neq 0 \quad (2)$$

where $\Delta Z_1$ represents a value obtained by subtracting a z-coordinate value of a point which has a maximum y-coordinate value on the emission surface from a z-coordinate value of an intersection of the central axis of the light flux controlling member with the emission surface, and $\Delta Z_2$ represents a value obtained by subtracting a z-coordinate value of a point which has a maximum x-coordinate value on the emission surface from the z-coordinate value of the intersection of the central axis of the light flux controlling member with the emission surface, the light flux controlling member being disposed in the three-dimensional orthogonal coordinate system in such a manner that $\Delta Z_2$ has a minimum value.

A light emitting device according to an embodiment of the present invention includes: the light flux controlling member; and a light emitting element, wherein the light flux controlling member is disposed in such a manner that a central axis of the light flux controlling member matches an optical axis of the light emitting element.

A lighting apparatus according to an embodiment of the present invention includes: the light emitting device; and a planar surface to be illuminated by light from the light emitting device, wherein the light emitting device is disposed in such a manner that the x axis in the three-dimensional orthogonal coordinate system is in parallel with the planar surface to be illuminated.

Advantageous Effects of Invention

The light emitting device having the light flux controlling member of the embodiment of the present invention can more uniformly illuminate a surface to be illuminated in comparison with existing light emitting devices. In addition, the lighting apparatus of the embodiment of the present invention can more uniformly illuminate a surface to be illuminated in comparison with existing lighting apparatuses.

DESCRIPTION OF EMBODIMENTS

Now, embodiments of the present invention will be described in detail with reference to the accompanying drawings.

Embodiment 1

[Configuration of Light Emitting Device]

Figure 4:
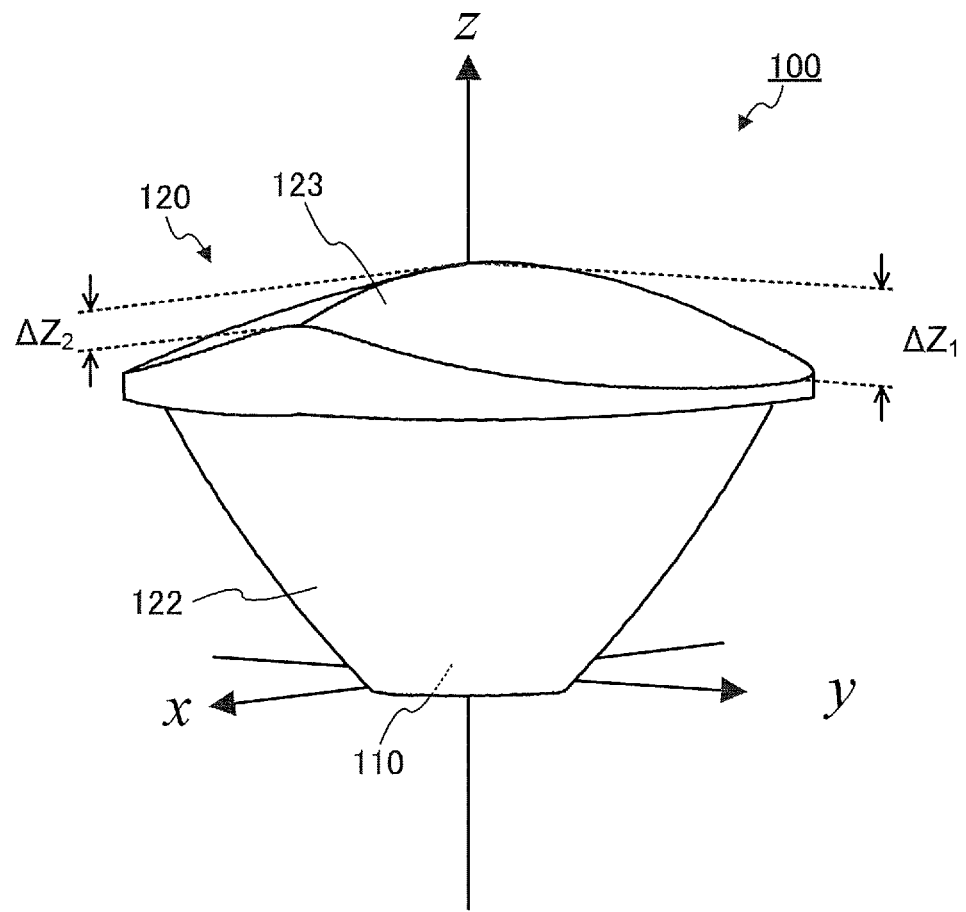
FIG. 4 is a perspective view of a light emitting device of Embodiment 1.

FIGS. 4 to 7 illustrate the configuration of a light emitting device of Embodiment 1 of the present invention. FIG. 4 is a perspective view of the light emitting device of Embodiment 1. FIG. 5A is a front view of the light emitting device of Embodiment 1, and FIG. 5B is a side view of the light emitting device of Embodiment 1. FIG. 6A is a plan view of the light emitting device of Embodiment 1, and FIG. 6B is a bottom view of the light emitting device of Embodiment 1. FIG. 7A is a sectional view taken along the line A-A of FIG. 5A, and FIG. 7B is a sectional view taken along the line B-B of FIG. 5B.

Here, as illustrated in FIG. 4, light flux controlling member 120 will be described on the assumption that light flux controlling member 120 is disposed in a three-dimensional orthogonal coordinate system in such a manner that the light emission center of light emitting element 110 is located at the origin, and central axis CA of light flux controlling member 120 extends along the z axis. The light axis direction of light emitting element 110 (the direction towards emission surface 123 of light flux controlling member 120 from the light emission center of light emitting element 110) corresponds to the forward direction of the z axis. It is to be noted that the description will be made on the assumption that light flux controlling member 120 is disposed in the three-dimensional orthogonal coordinate system in such a manner that $\Delta Z_2$ described later has the minimum value.

As illustrated in FIGS. 4 to 7, light emitting device 100 of Embodiment 1 includes light emitting element 110 and light flux controlling member 120. Light flux controlling member 120 is formed by integral molding. The material of light flux controlling member 120 is not specifically limited as long as light having desired wavelengths can pass through light flux controlling member 120. Examples of the material of light flux controlling member 120 include light transmissive resins such as polymethylmethacrylate (PMMA), polycarbonate (PC), and epoxy resin (EP), and glass.

Light emitting element 110 is a light source of light emitting device 100. Light emitting element 110 is composed of a light-emitting diode (LED) such as a white light-emitting diode, for example. Light emitting element 110 is disposed in recess 124 formed on the bottom side of light flux controlling member 120 (see FIG. 7A and FIG. 7B).

Light flux controlling member 120 controls the travelling direction of light emitted from light emitting element 110. Light flux controlling member 120 is disposed in such a manner that central axis CA thereof matches the optical axis of light emitting element 110 (see FIG. 7A and FIG. 7B).

Figure 7A:
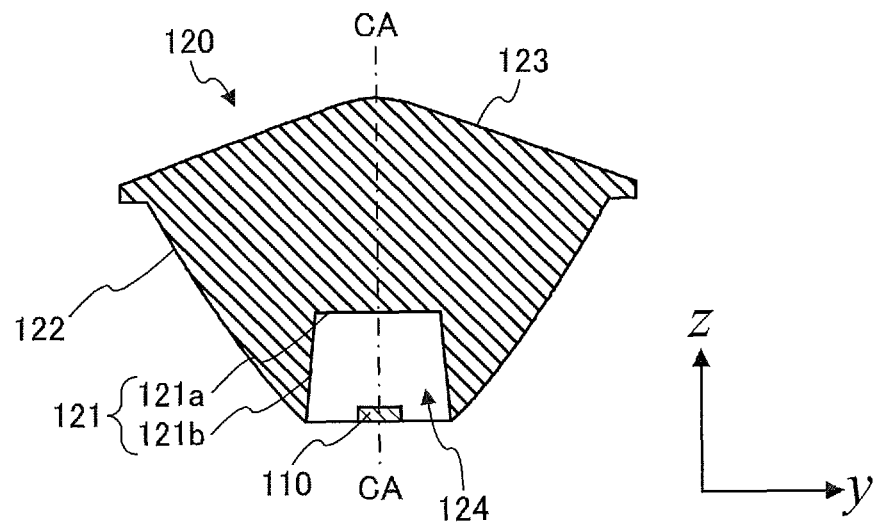
FIG. 7A is a sectional view taken along the line A-A of FIG. 5A.
Figure 7B:
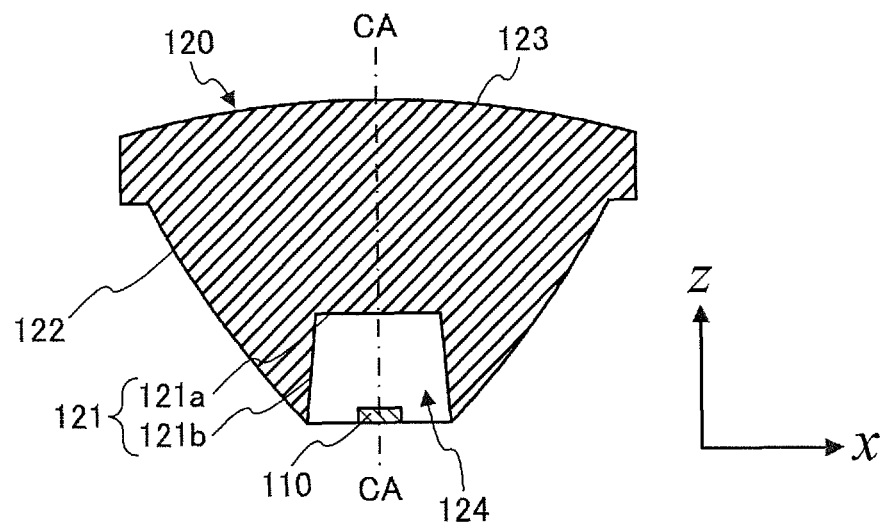
FIG. 7B is a sectional view taken along the line B-B of FIG. 5B.

As illustrated in FIG. 7A and FIG. 7B, light flux controlling member 120 includes incidence surface 121 on which light emitted from light emitting element 110 is incident, total reflection surface 122 that totally reflects part of light incident on incidence surface 121, and emission surface 123 that emits part of light incident on incidence surface 121 and light reflected by total reflection surface 122.

Incidence surface 121 is an internal surface of recess 124 formed on the bottom side of light flux controlling member 120. Incidence surface 121 is so formed as to face light emitting element 110 and to intersect with central axis CA of light flux controlling member 120. Incidence surface 121 is a rotationally symmetrical surface formed about central axis CA. Incidence surface 121 includes internal top surface 121a composing the top surface of recess 124, and tapered internal surface 121b composing the side surfaces of recess 124. The internal diameter of internal surface 121b is gradually increased from internal top surface 121a side toward the opening edge side so that the internal diameter of the opening edge is greater than that of internal top surface 121a.

Total reflection surface 122 is a surface that extends from the outer edge of the bottom of light flux controlling member 120 to the outer edge of emission surface 123. A flange may be provided between the outer edge of total reflection surface 122 and the outer edge of emission surface 123. Total reflection surface 122 is a rotationally symmetrical surface that is so formed as to surround central axis CA of light flux controlling member 120. The diameter of total reflection surface 122 gradually increases from incidence surface 121 side (bottom side) toward emission surface 123 side. The generatrix of total reflection surface 122 is an arc-like curve protruding outward (away from central axis CA) (see FIG. 7A and FIG. 7B).

Emission surface 123 is located on the side opposite to incidence surface 121 (bottom) in light flux controlling member 120, and is so formed as to intersect with central axis CA of light flux controlling member 120. As illustrated in FIG. 4, emission surface 123 is plane-symmetrical to the xz plane.

Light flux controlling member 120 of Embodiment 1 is mainly characterized in that the form of emission surface 123 satisfies the following Expression (1) and Expression (2).

$$\Delta Z_1 > \Delta Z_2 \quad (1)$$

$$\Delta Z_2 \neq 0 \quad (2)$$

In Expression (1) and Expression (2), $\Delta Z_1$ represents a value obtained by subtracting the z-coordinate value of the point which has the maximum y-coordinate value on emission surface 123, from the z-coordinate value of the intersection (the vertex of emission surface 123) of central axis CA (the z axis) with emission surface 123 of light flux controlling member 120. In other words, as illustrated in FIG. 4 and FIG. 5B, $\Delta Z_1$ represents a variation of the z-coordinate on emission surface 123 relative to the y-axis direction. In light flux controlling member 120 of Embodiment 1, emission surface 123 has a convex form, and therefore $\Delta Z_1$ is a positive value.

In addition, in Expression (1) and Expression (2), $\Delta Z_2$ represents a value obtained by subtracting the z-coordinate value of the point which has the maximum x-coordinate value on emission surface 123, from the z-coordinate value of the intersection (the vertex of emission surface 123) of central axis CA (the z axis) with emission surface 123 of light flux controlling member 120. In other words, as illustrated in FIG. 4 and FIG. 5B, $\Delta Z_2$ represents a variation of the z-coordinate on emission surface 123 relative to the x-axis direction. In light flux controlling member 120 of Embodiment 1, emission surface 123 has a convex form, and therefore $\Delta Z_2$ is a positive value. As described above, light flux controlling member 120 disposed in the three-dimensional orthogonal coordinate system in such a manner that $\Delta Z_2$ has the minimum value (see FIG. 4).

Figure 5A:
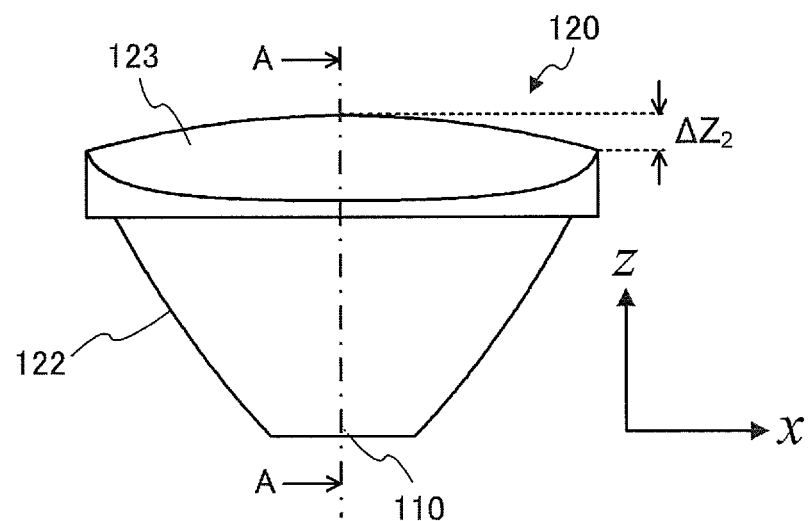
FIG. 5A is a front view of the light emitting device of Embodiment 1.
Figure 5B:
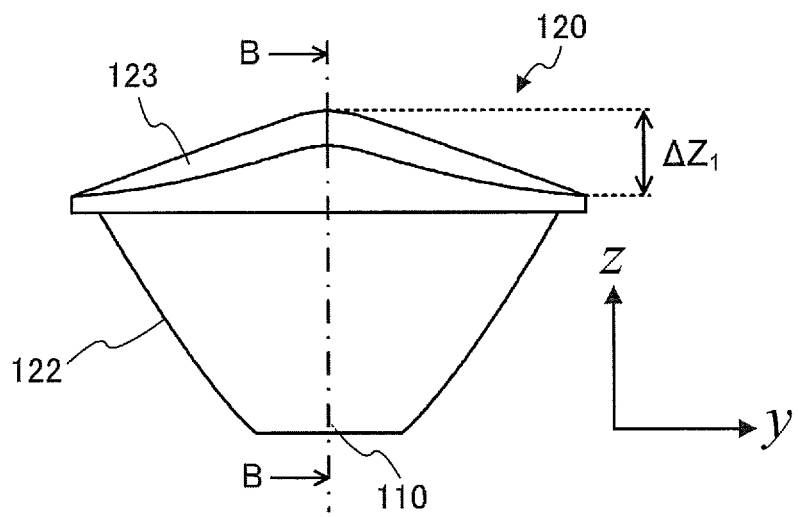
FIG. 5B is a side view of the light emitting device of Embodiment 1.
Figure 6A:
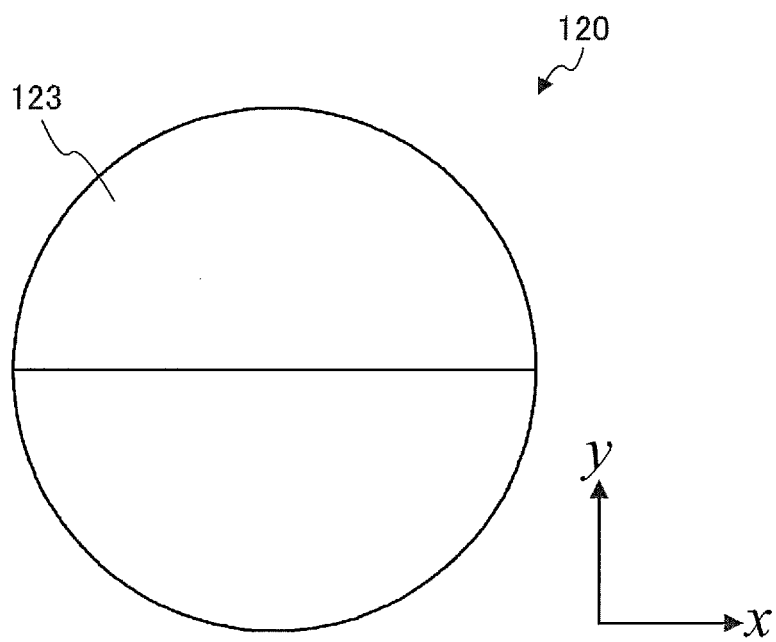
FIG. 6A is a plan view of the light emitting device of Embodiment 1.
Figure 6B:
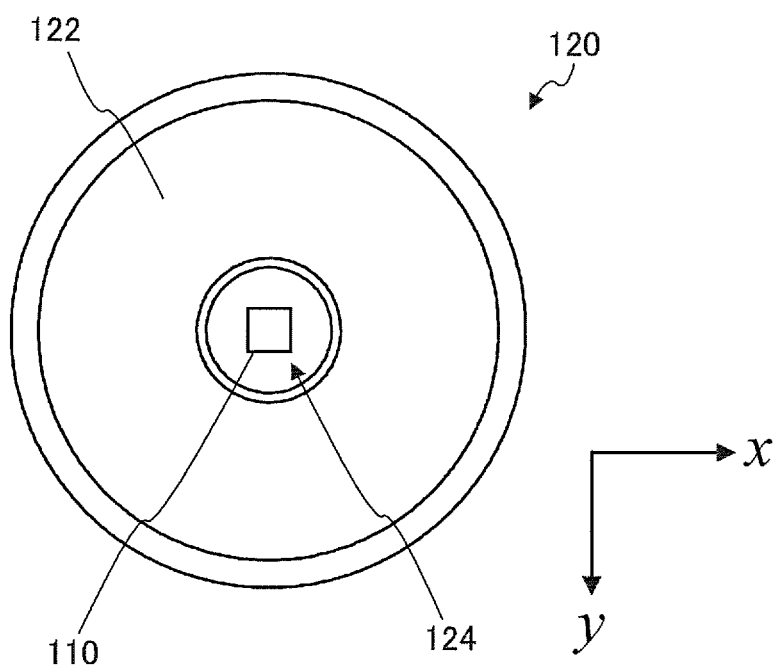
FIG. 6B is a bottom view of the light emitting device of Embodiment 1.

Expression (2) means that emission surface 123 has a curvature in a cross-section (the xz plane) at y=0 (see FIG. 5A). In the case of a light flux controlling member having an emission surface of a substantially cylindrical form, $\Delta Z_2$=0 is satisfied. Accordingly, when Expression (2) is satisfied, emission surface 123 of light flux controlling member 120 does not have a substantially cylindrical form.

In addition, Expression (1) means that the curvature of emission surface 123 in the cross-section (the yz plane) at x=0 differs from the curvature of emission surface 123 in the cross-section (the xz plane) at y=0 (see and compare FIG. 5A with FIG. 5B). In the case of the light flux controlling member having a rotationally symmetrical emission surface, $\Delta Z_1 = \Delta Z_2$ is satisfied. Accordingly, when Expression (1) is satisfied, emission surface 123 of light flux controlling member 120 does not have a rotationally symmetrical form.

Emission surface 123 of light flux controlling member 120 has a substantially toroidal form. The "substantially toroidal form" herein is a form which has a ridgeline on the xz plane, has a curvature in any cross-section in parallel with the xz plane, and satisfies $R_1 = R_2$ in any cross-section in parallel with the xz plane, where $R_1$ represents a curvature radius of the emission surface of x=0, and $R_2$ represents a curvature radius of the emission surface at any point of x≠0.

For example, the form of emission surface 123 of light flux controlling member 120 is a toroidal form in a narrow sense. Here the "toroidal form in a narrow sense" is a form which satisfies $x_1 = x_2 = 0$ and $z_1 = z_2$, where, in the three-dimensional orthogonal coordinate system, the coordinate of curvature center $O_1$ of emission surface 123 in a cross-section in parallel with the xz plane at y=0 is represented by $(x_1, y_1, z_1)$ $(y_1 = 0)$, and the coordinate of curvature center $O_2$ of emission surface 123 in a cross-section in parallel with the xz plane at y≠0 is represented by $(x_2, y_2, z_2)$.

Figure 8A:
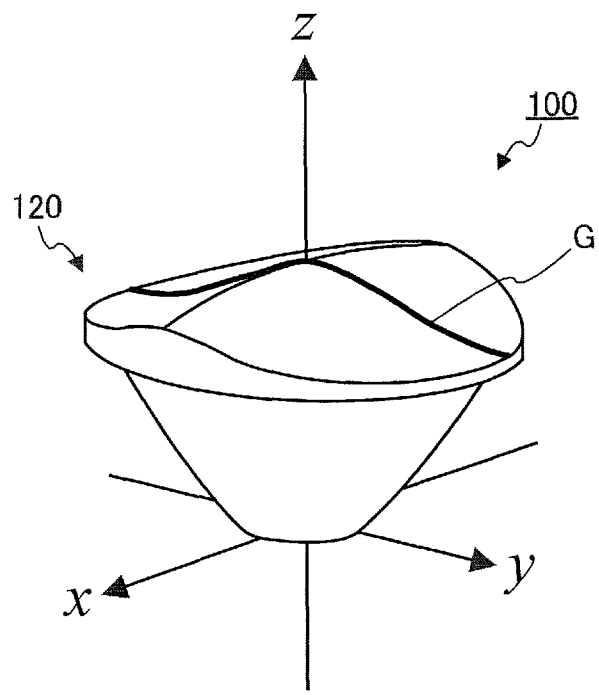
FIG. 8A is a perspective view of the light emitting device of Embodiment 1 for illustrating a generatrix of an emission surface.
Figure 8B:
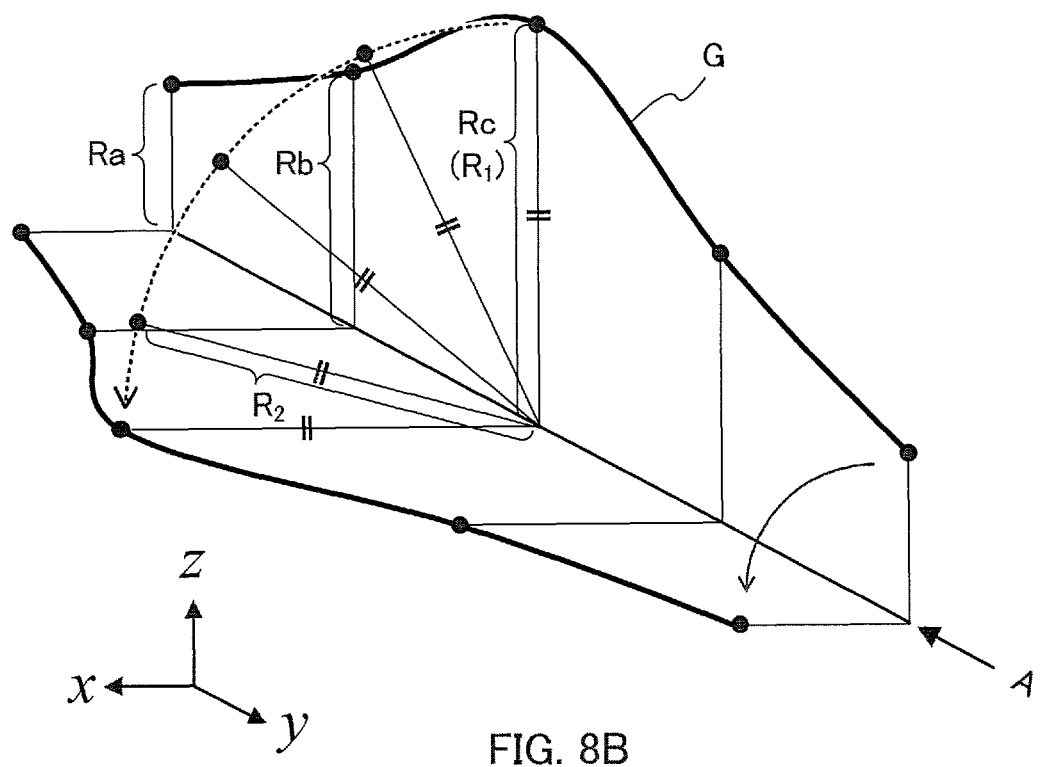
FIG. 8B is a schematic view for illustrating a toroidal form in a narrow sense.

With reference to FIG. 8A and FIG. 8B, the toroidal form in a narrow sense will be described. As illustrated in FIG. 8A, the intersection line of emission surface 123 with the yz plane is generatrix G. In this case, as illustrated in FIG. 8B, the form of emission surface 123 matches a part (a part cut out along the maximum diameter (outer edge) of emission surface 123) of the form obtained by rotating generatrix G about linear rotational axis A. That is, the curvature radius of emission surface 123 in the cross-section in parallel with the xz plane which passes through points on generatrix G of emission surface 123 differs from cross-section to another (Ra≠Rb≠Rc), and the curvature center of emission surface 123 of each of the cross-sections is located on a straight line in parallel with the y axis (a straight line obtained by translating the y axis in the z-axis direction).

In addition, the form of emission surface 123 of light flux controlling member 120 may also be a toroidal form in a broad sense. Here, the "toroidal form in a broad sense" means a form which satisfies $x_1 = x_2 = 0$ and $z_1 \neq z_2$, where, in the three-dimensional orthogonal coordinate system, the coordinate of curvature center $O_1$ of emission surface 123 in a cross-section in parallel with the xz plane at y=0 is represented by $(x_1, y_1, z_1)$, and the coordinate of curvature center $O_2$ of emission surface 123 in a cross-section in parallel with the xz plane at y≠0 is represented by $(x_2, y_2, z_2)$.

Figure 9:
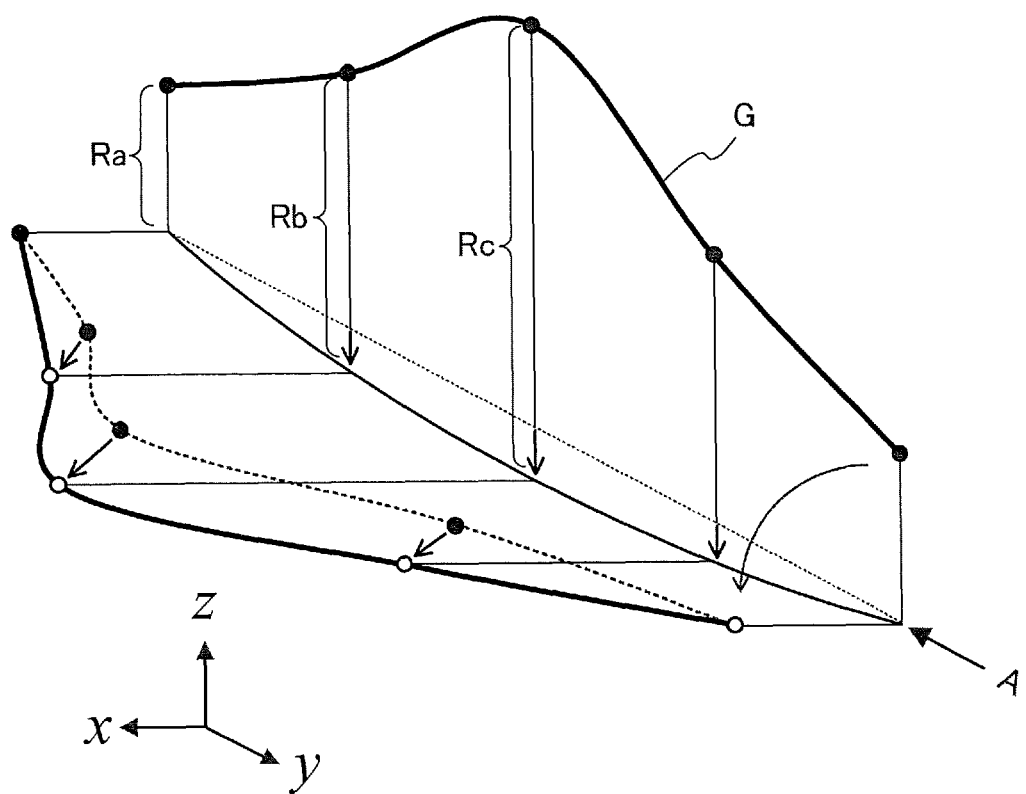
FIG. 9 is a schematic view for illustrating a toroidal form in a broad sense.

With reference to FIG. 8A and FIG. 9, the toroidal form in a broad sense will be described. As illustrated in FIG. 8A, the intersection line of emission surface 123 with the yz plane is generatrix G. In this case, as illustrated in FIG. 9, the form of emission surface 123 is obtained by rotating generatrix G about rotational axis A in a form of a curved line. That is, the curvature radius of emission surface 123 in the cross-section in parallel with the xz plane which passes through points on generatrix G of emission surface 123 differs from cross-section to another (or may be Ra=Rb=Rc depending on the curve of the rotational axis), and the curvature center of emission surface 123 of each of the cross-sections is located on an arbitrary curve on the yz plane. It is to be noted that the straight line and the curve shown by the broken line in FIG. 9 are the linear rotational axis and generatrix G obtained by rotating generatrix G about the linear rotational axis by 90°, in FIG. 8B. As is clear from the comparison between the solid line and the broken line, the form of emission surface 123 differs between the toroidal form in a narrow sense and the toroidal form in a broad sense.

In both of the case where the form of emission surface 123 is the toroidal form in a narrow sense and the case where the form of emission surface 123 is the toroidal form in a broad sense, the distributions of light in the x-axis direction and the y-axis direction can be precisely controlled by individually adjusting the curvature radiuses Ra, Rb and Rc in accordance with the positional relationship between light emitting device 100 and the surface to be illuminated.

[Simulation of Light Distribution Characteristics of Light Flux Controlling Member]

Figure 10A:
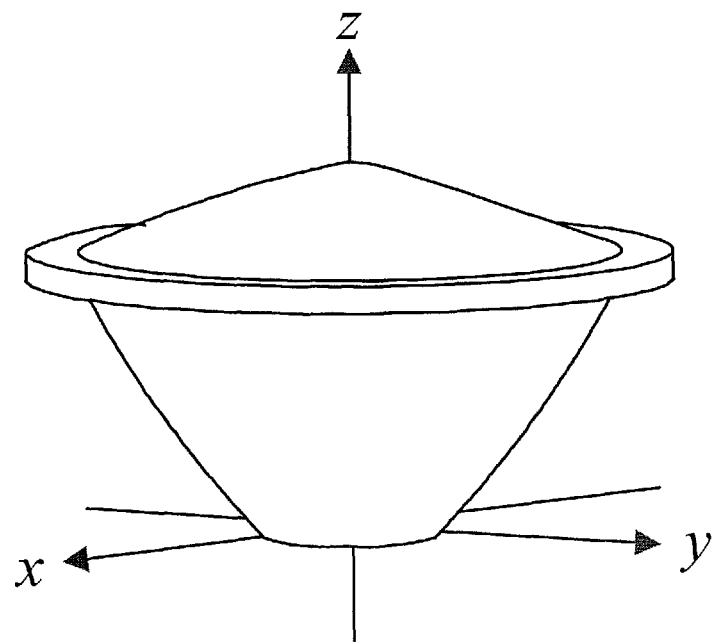
FIG. 10A is a perspective view of a light flux controlling member having a rotationally symmetrical emission surface.
Figure 10B:
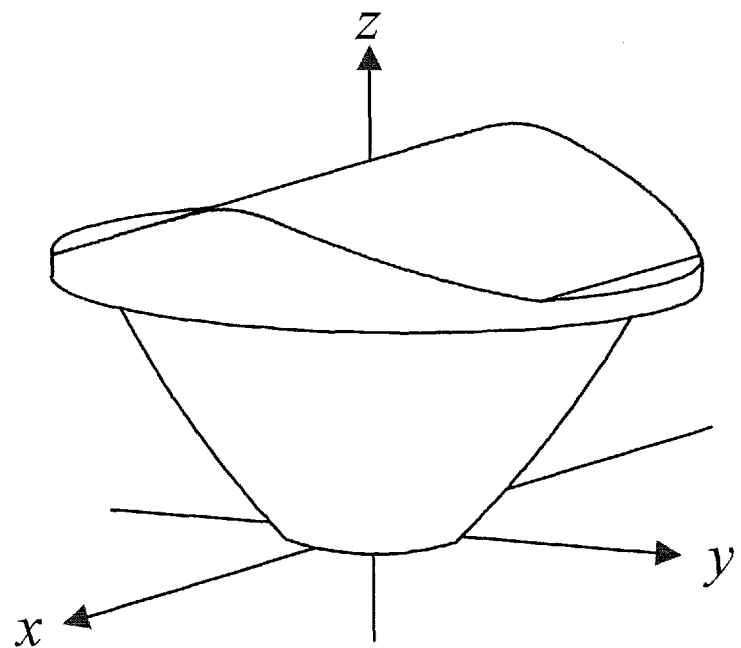
FIG. 10B is a perspective view of a light flux controlling member having an emission surface of a substantially cylindrical form.
Figure 11:
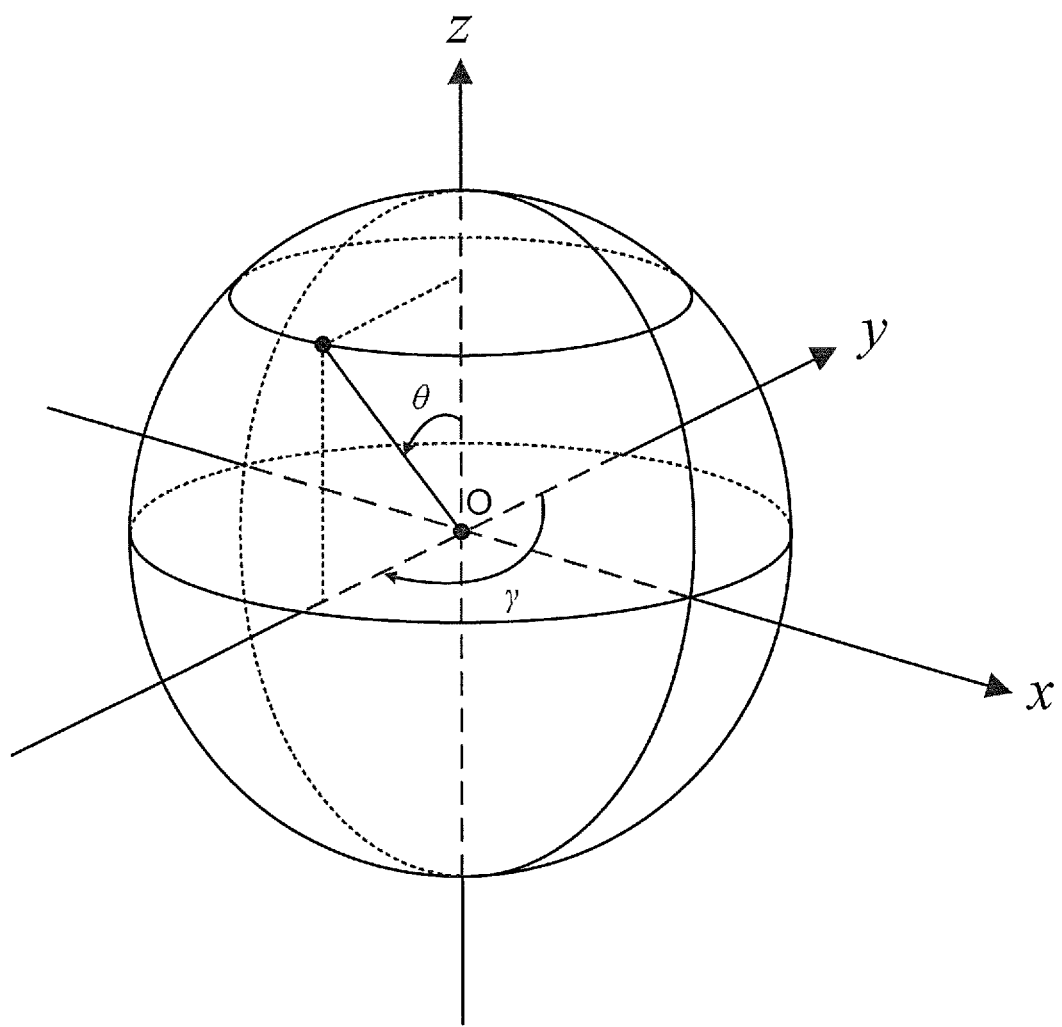
FIG. 11 is a schematic view for describing a light emission angle in a simulation.
Figure 12:
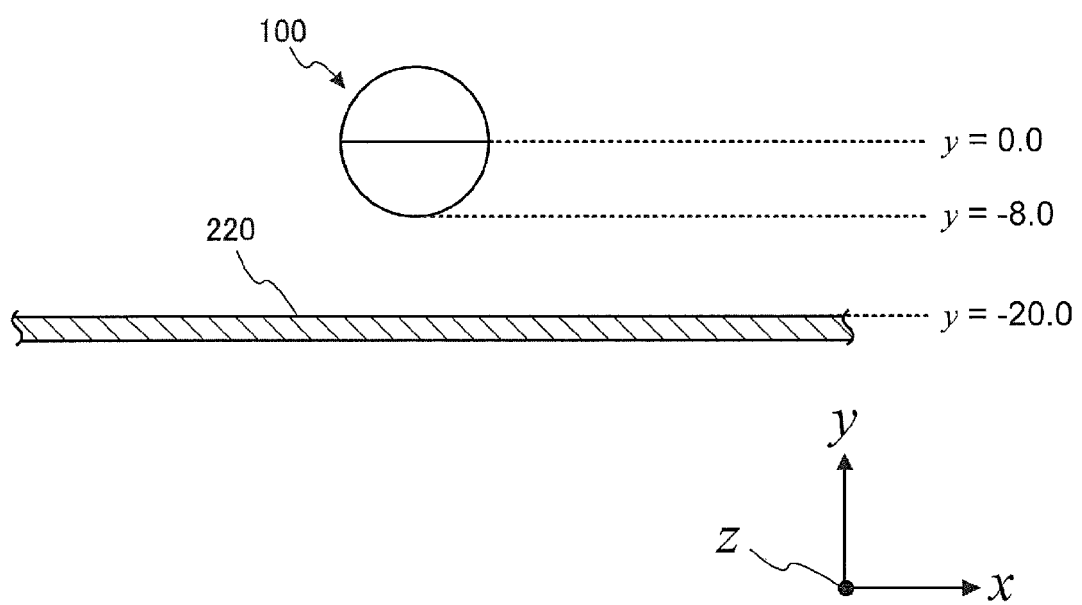
FIG. 12 is a schematic view for describing a positional relationship between a light emitting device and a surface to be illuminated in a simulation.

The light distribution characteristics of light flux controlling member 120 of Embodiment 1 illustrated in FIGS. 4 to 7 was simulated. Emission surface 123 had the toroidal form in a narrow sense. For comparison, the light distribution characteristics of the light flux controlling member having the rotationally symmetrical emission surface, and a light flux controlling member having the emission surface of a substantially cylindrical form illustrated in FIG. 10A and FIG. 10B were also simulated. In this simulation, as illustrated in FIG. 11, light paths of light emitted from the light emission center (origin) of a light emitting element at the angle of (θ, γ) were calculated. The light flux controlling members had substantially the same size, and the outer edge of the emission surface passes through x=±8.0 and y=±8.0 (see FIG. 13). As illustrated in FIG. 12, it was assumed that illumination surface 220 is disposed at a position of y=−20.0 in such a manner as to be in parallel with the xz plane of the light flux controlling member.

Figure 13A:
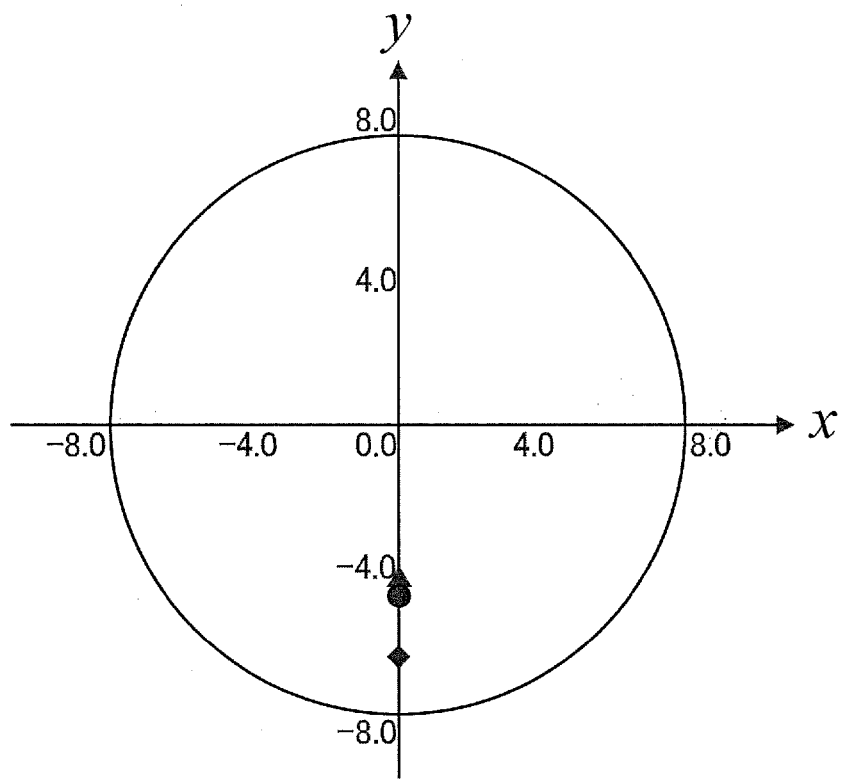
FIG. 13A and FIG. 13B each illustrate intersections of light beams with an emission surface in the case of a light flux controlling member having a rotationally symmetrical emission surface.

Table 1 to Table 3 show results of the simulation of light paths of emission light of γ=180° (light that travels in a direction perpendicular to the surface to be illuminated in plan view). Table 1 to Table 3 show coordinates of the points where light beams intersect with the surfaces of the light flux controlling member (incidence surface, total reflection surface and emission surface) and the illuminated surface. As an example, FIG. 13A illustrates positions of intersections of light beams in plan view of the emission surface of the light flux controlling member having the rotationally symmetrical emission surface (see FIG. 10A). In FIG. 13A, the quadrangular marker represents the light emitted at γ=180° and θ=40°, the round marker the light emitted at γ=180° and θ=60°, and the triangular marker the light emitted at γ=180° and θ=70°.

TABLE 1

Light Path of Light Emitted at γ = 180° and θ = 40°

| | | Light emitting element | Incidence Surface | Total Reflection Surface | Emission Surface | Illuminated Surface |
|---|---|---|---|---|---|---|
| Toroidal Form | x | 0.0 | 0.0 | 0.0 | 0.0 | 0.0 |
| (FIGS. 4 to 7) | y | 0.0 | −2.0 | −6.1 | −6.4 | −20.0 |
| | z | 0.0 | 2.4 | 5.1 | 7.8 | 14921.0 |
| Rotationally | x | 0.0 | 0.0 | 0.0 | 0.0 | 0.0 |
| Symmetrical Form | y | 0.0 | −2.0 | −6.1 | −6.4 | −20.0 |
| (FIG. 10A) | z | 0.0 | 2.4 | 5.1 | 7.8 | 14921.0 |
| Cylindrical Form | x | 0.0 | 0.0 | 0.0 | 0.0 | 0.0 |
| (FIG. 10B) | y | 0.0 | −2.0 | −6.1 | −6.4 | −20.0 |
| | z | 0.0 | 2.4 | 5.1 | 7.8 | 14921.0 |

TABLE 2

Light Path of Light Emitted at γ = 180° and θ = 60°

| | | Light emitting element | Incidence Surface | Total Reflection Surface | Emission Surface | Illuminated Surface |
|---|---|---|---|---|---|---|
| Toroidal Form | x | 0.0 | 0.0 | 0.0 | 0.0 | 0.0 |
| (FIGS. 4 to 7) | y | 0.0 | −2.1 | −4.0 | −4.7 | −20.0 |
| | z | 0.0 | 1.2 | 2.0 | 8.4 | 136200.0 |
| Rotationally | x | 0.0 | 0.0 | 0.0 | 0.0 | 0.0 |
| Symmetrical Form | y | 0.0 | −2.1 | −4.0 | −4.7 | −20.0 |
| (FIG. 10A) | z | 0.0 | 1.2 | 2.0 | 8.4 | 136200.0 |
| Cylindrical Form | x | 0.0 | 0.0 | 0.0 | 0.0 | 0.0 |
| (FIG. 10B) | y | 0.0 | −2.1 | −4.0 | −4.7 | −20.0 |
| | z | 0.0 | 1.2 | 2.0 | 8.4 | 136200.0 |

TABLE 3

Light Path of Light Emitted at γ = 180° and θ = 70°

| | | Light emitting element | Incidence Surface | Total Reflection Surface | Emission Surface | Illuminated Surface |
|---|---|---|---|---|---|---|
| Toroidal Form | x | 0.0 | 0.0 | 0.0 | 0.0 | 0.0 |
| (FIGS. 4 to 7) | y | 0.0 | −2.2 | −3.3 | −4.2 | −20.0 |
| | z | 0.0 | 0.8 | 1.1 | 8.6 | 27275.0 |
| Rotationally | x | 0.0 | 0.0 | 0.0 | 0.0 | 0.0 |
| Symmetrical Form | y | 0.0 | −2.2 | −3.3 | −4.2 | −20.0 |
| (FIG. 10A) | z | 0.0 | 0.8 | 1.1 | 8.6 | 27275.0 |
| Cylindrical Form | x | 0.0 | 0.0 | 0.0 | 0.0 | 0.0 |
| (FIG. 10B) | y | 0.0 | −2.2 | −3.3 | −4.2 | −20.0 |
| | z | 0.0 | 0.8 | 1.1 | 8.6 | 27275.0 |

Table 1 to Table 3 suggest that the greater the value of θ, the more the emitted light reaches the upper region of the illuminated surface (the region having greater z values). As shown in Table 1 to Table 3, regarding the direction of γ=180°, there was no difference in light distribution characteristics among the light flux controlling member having the emission surface of the toroidal form (see FIGS. 4 to 7), the light flux controlling member having the rotationally symmetrical emission surface (see FIG. 10A), and the light flux controlling member having the emission surface of the substantially cylindrical form (see FIG. 10B). In other words, there was no difference in y-directional light distribution characteristics among the light flux controlling members.

Figure 13B:
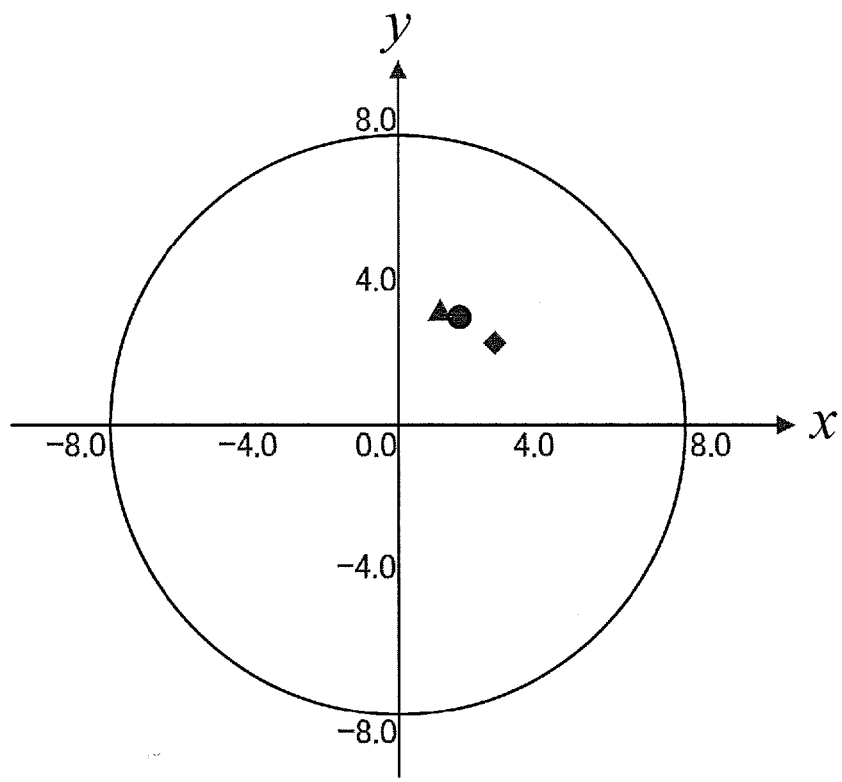

Table 4 to Table 6 show results of the simulation of light paths of emission light of γ≠180° (light that travels in a direction oblique to the surface to be illuminated in plan view). Table 4 to Table 6 show coordinates of the points where light beams intersect with the surfaces of the light flux controlling member (incidence surface, total reflection surface and emission surface) and the illuminated surface. As an example, FIG. 13B illustrates positions of intersections of light beams in plan view of the emission surface of the light flux controlling member having the rotationally symmetrical emission surface (see FIG. 10A). In FIG. 13B, the quadrangular marker represents the light emitted at γ=50° and θ=82°, the round marker the light emitted at γ=30° and θ=85°, and the triangular marker the light emitted at γ=20° and θ=87°.

TABLE 4

Light Path of Light Emitted at $\gamma = 50°$ and $\theta = 82°$

| | | Light emitting element | Incidence surface | Total Reflection Surface | Emission Surface | Illuminated Surface |
|---|---|---|---|---|---|---|
| Toroidal Form | x | 0.0 | 1.7 | 2.0 | 2.8 | 34.5 |
| (FIGS. 4 to 7) | y | 0.0 | 1.4 | 1.7 | 2.3 | −20.0 |
| | z | 0.0 | 0.3 | 0.3 | 9.2 | 380.2 |
| Rotationally | x | 0.0 | 1.7 | 2.0 | 2.7 | −23.5 |
| Symmetrical Form | y | 0.0 | 1.4 | 1.7 | 2.3 | −20.0 |
| (FIG. 10A) | z | 0.0 | 0.3 | 0.3 | 8.8 | 21194.0 |
| Cylindrical Form | x | 0.0 | 1.7 | 2.0 | 2.8 | 50.8 |
| (FIG. 10B) | y | 0.0 | 1.4 | 1.7 | 2.3 | −20.0 |
| | z | 0.0 | 0.3 | 0.3 | 9.3 | 372.1 |

TABLE 5

Light Path of Light Emitted at $\gamma = 30°$ and $\theta = 85°$

| | | Light emitting element | Incidence surface | Total Reflection Surface | Emission Surface | Illuminated Surface |
|---|---|---|---|---|---|---|
| Toroidal Form | x | 0.0 | 1.1 | 1.2 | 1.7 | 55.9 |
| (FIGS. 4 to 7) | y | 0.0 | 1.9 | 2.1 | 3.0 | −20.0 |
| | z | 0.0 | 0.2 | 0.2 | 9.1 | 969.9 |
| Rotationally | x | 0.0 | 1.1 | 1.2 | 1.7 | −11.4 |
| Symmetrical Form | y | 0.0 | 1.9 | 2.1 | 3.0 | −20.0 |
| (FIG. 10A) | z | 0.0 | 0.2 | 0.2 | 8.9 | 17576.0 |
| Cylindrical Form | x | 0.0 | 1.1 | 1.2 | 1.7 | 82.2 |
| (FIG. 10B) | y | 0.0 | 1.9 | 2.1 | 3.0 | −20.0 |
| | z | 0.0 | 0.2 | 0.2 | 9.0 | 951.5 |

TABLE 6

Light Path of Light Emitted at $\gamma = 20°$ and $\theta = 87°$

| | | Light emitting element | Incidence Surface | Total Reflection Surface | Emission Surface | Illuminated Surface |
|---|---|---|---|---|---|---|
| Toroidal Form | x | 0.0 | 0.8 | 0.8 | 1.2 | 81.9 |
| (FIGS. 4 to 7) | y | 0.0 | 2.1 | 2.2 | 3.2 | −20.0 |
| | z | 0.0 | 0.1 | 0.1 | 9.0 | 2080.2 |
| Rotationally | x | 0.0 | 0.8 | 0.8 | 1.1 | −7.2 |
| Symmetrical Form | y | 0.0 | 2.1 | 2.2 | 3.2 | −20.0 |
| (FIG. 10A) | z | 0.0 | 0.1 | 0.1 | 8.9 | 23291.0 |
| Cylindrical Form | x | 0.0 | 0.8 | 0.8 | 1.1 | 119.8 |
| (FIG. 10B) | y | 0.0 | 2.1 | 2.2 | 3.2 | −20.0 |
| | z | 0.0 | 0.1 | 0.1 | 9.0 | 2045.0 |

Figure 1A:
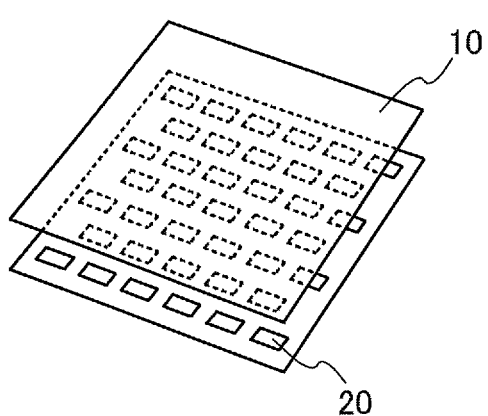
FIG. 1A is a perspective view illustrating an exemplary direct-type internal illumination signboard.
Figure 1B:
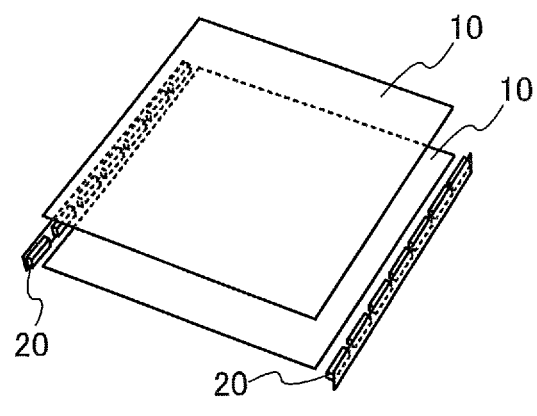
FIG. 1B is a perspective view illustrating an exemplary edge-lit type hollow internal illumination signboard.
Figure 2:
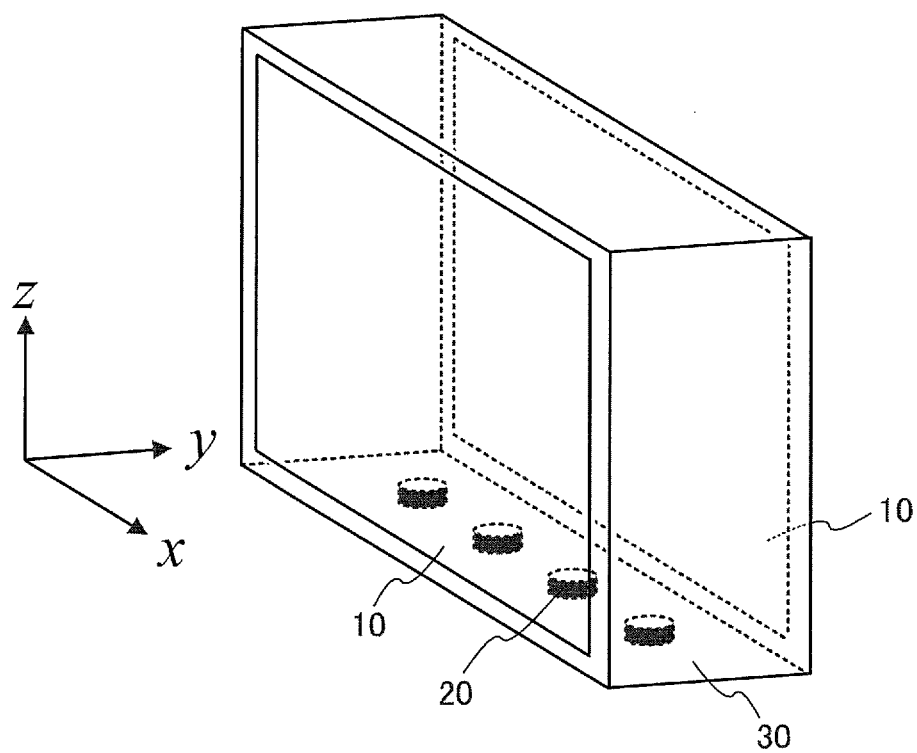
FIG. 2 is a perspective view illustrating an exemplary edge-lit type hollow internal illumination signboard which has a plurality of light emitting devices.
Figure 3A:
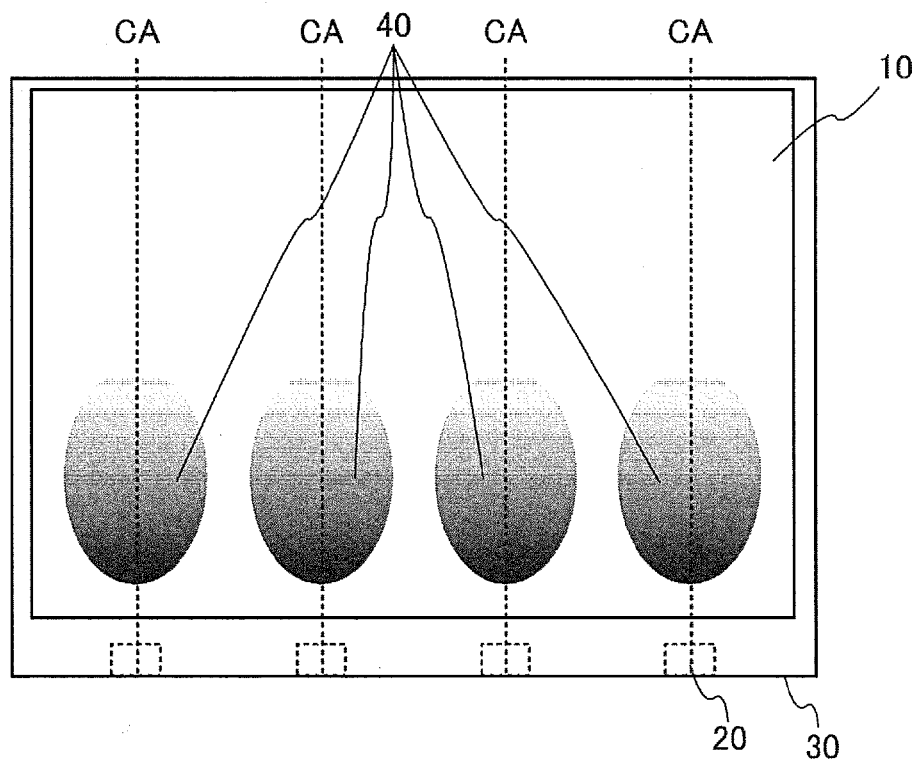
FIG. 3A is a front view illustrating a surface to be illuminated of an edge-lit type hollow internal illumination signboard which has a light emitting device including a light flux controlling member having a rotationally symmetrical emission surface.

Table 4 to Table 6 suggest that the light flux controlling member having the rotationally symmetrical emission surface (see FIG. 10A) has small x values and great z values, and therefore has extremely strong light-collecting power. When a light emitting device including such a light flux controlling member having excessively strong light-collecting power is employed in the internal illumination signboard having illumination surface 220 in parallel with the xz plane, the amount of light for illuminating parts of the surface to be illuminated which correspond to the regions between the adjacent light emitting devices is insufficient, and thus bright sites 40 corresponding to the positions of the light emitting devices undesirably stand out (see FIG. 3A). In other words, dark sites are easily formed between adjacent bright sites 40.

Figure 3B:
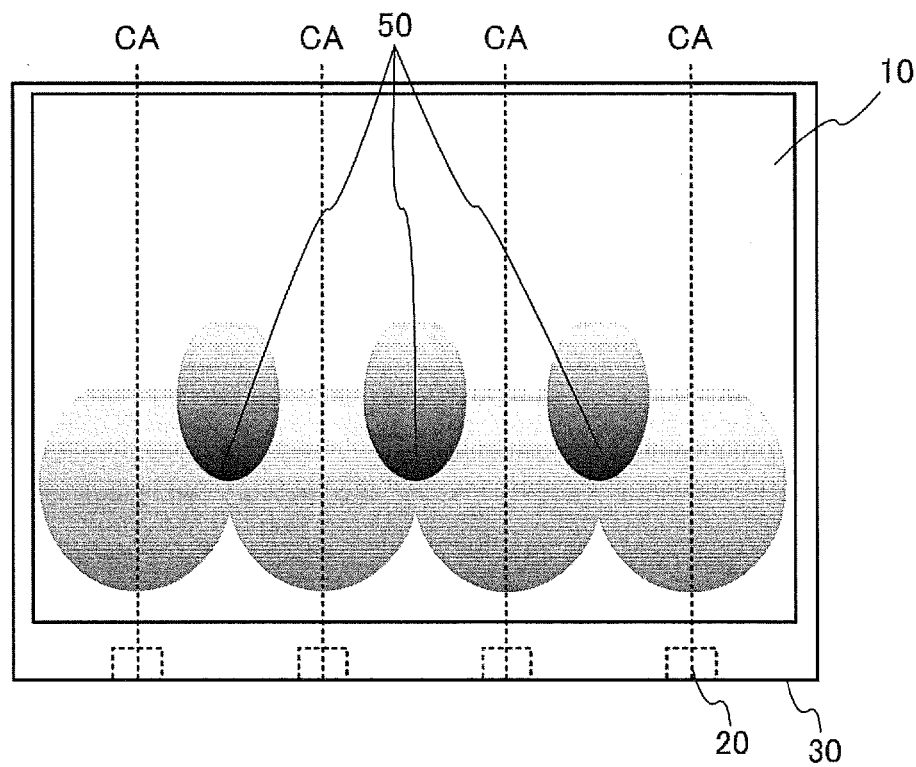
FIG. 3B is a front view illustrating a surface to be illuminated of an edge-lit type hollow internal illumination signboard which has a light emitting device including a light flux controlling member having an emission surface of a substantially cylindrical form.

Table 4 to Table 6 also suggest that, in comparison with the light flux controlling member having the rotationally symmetrical emission surface, the light flux controlling member having the emission surface of the substantially cylindrical form (see FIG. 10B) can expand light in the x-axis direction (or has greater x values). However, the light flux controlling member having the emission surface of the substantially cylindrical form cannot adjust the x-directional curvature of the emission surface, and therefore cannot adjust the expansion of emitted light in accordance with the intervals of the light emitting devices. For this reason, when the light emitting device including the light flux controlling member having the emission surface of the substantially cylindrical form is used in the internal illumination signboard, shining sites 50 are easily formed between the light emitting devices (see FIG. 3B).

Figure 14:
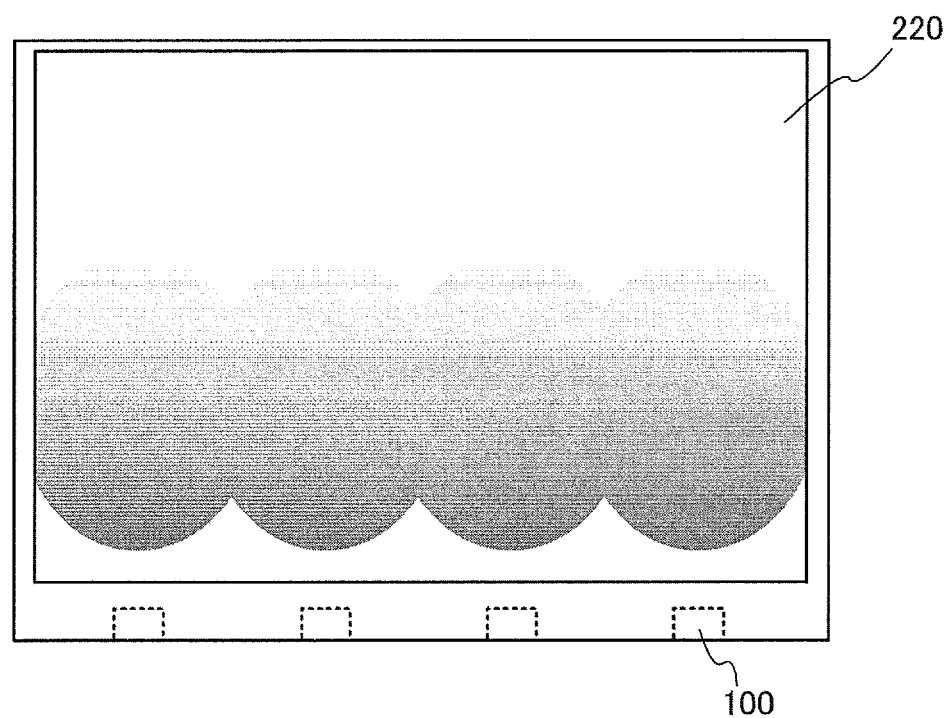
FIG. 14 is a front view illustrating an illuminated surface of an edge-lit type hollow internal illumination signboard which has the light emitting device of Embodiment 1.

On the other hand, as with the light flux controlling member having the emission surface of the substantially cylindrical form, light flux controlling member 120 having the emission surface of the toroidal form (see FIGS. 4 to 7) can expand light in the x-axis direction (or has great x values). Further, light flux controlling member 120 having the emission surface of the toroidal form can adjust the x-directional curvature, and therefore can adjust the expansion of emitted light in the x-axis direction in accordance with the intervals of light emitting devices 100. Actually, in Table 4 to Table 6, light flux controlling member 120 having the emission surface of the toroidal form has smaller x values in comparison with the light flux controlling member having the emission surface of the substantially cylindrical form. For this reason, when light emitting device 100 including light flux controlling member 120 having the emission surface of the toroidal form is used in an internal illumination signboard, bright site 40 and shining site 50 are not easily formed between light emitting devices 100 illustrated in FIG. 14.

[Configuration of Lighting Apparatus]

Next, a lighting apparatus including light emitting device 100 of Embodiment 1 will be described. Here, as a typical example of the lighting apparatus of the embodiment of the present invention, an internal illumination type lighting apparatus (e.g., an internal illumination signboard) will be described.

Figure 15:
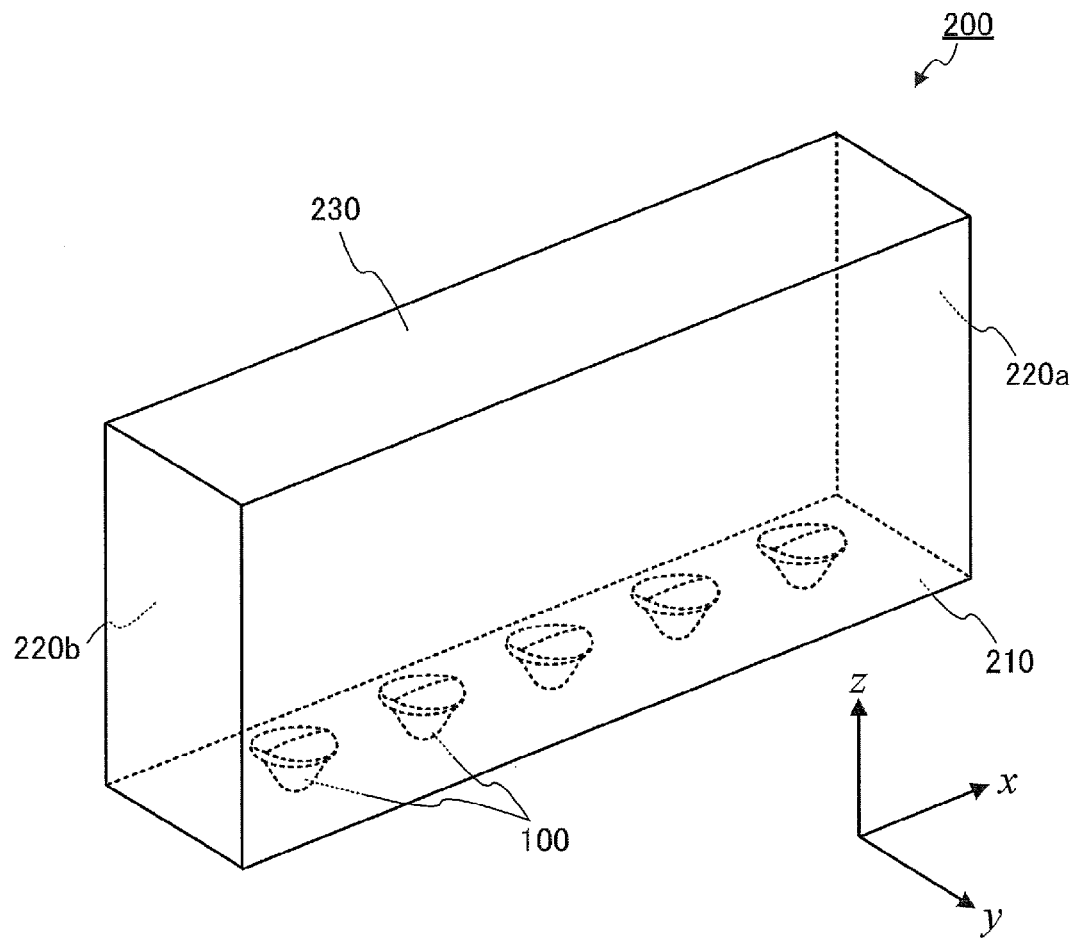
FIG. 15 is a perspective view of the lighting apparatus of Embodiment 1.
Figure 16:
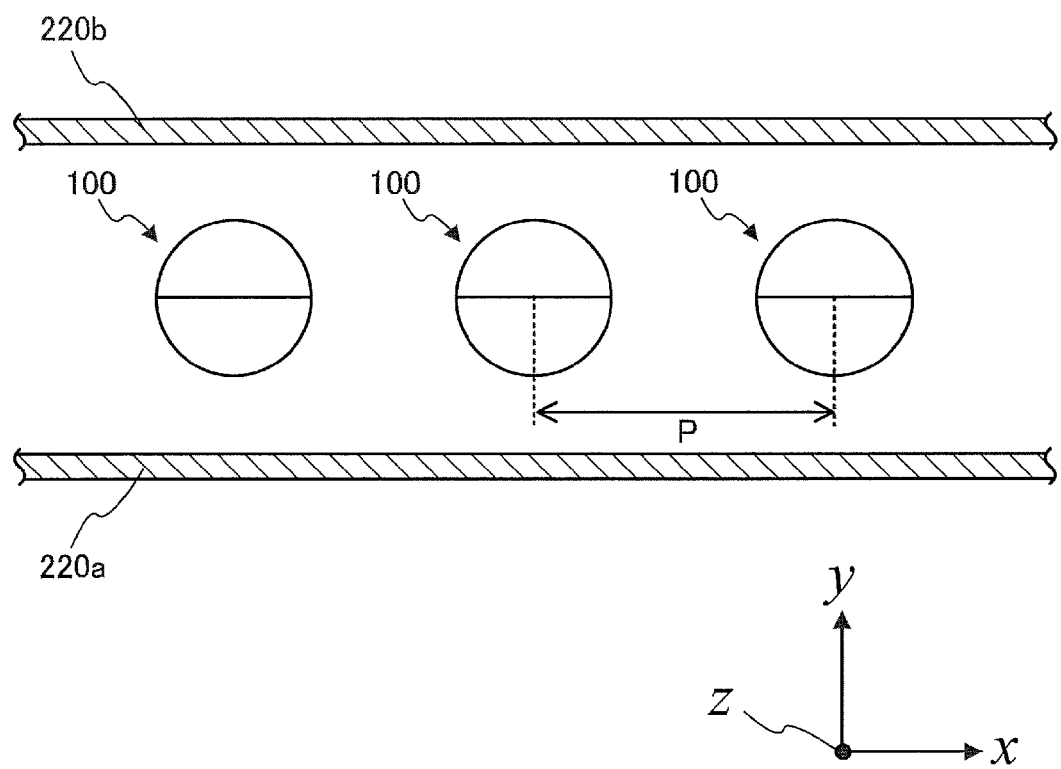
FIG. 16 is an enlarged plan view illustrating a part of the lighting apparatus of Embodiment 1.

FIG. 15 is a perspective view of lighting apparatus 200 of Embodiment 1. FIG. 16 is a partially enlarged plan view of lighting apparatus 200 of Embodiment 1. It is to be noted that top plate 230 is omitted in FIG. 16.

As illustrated in FIG. 15 and FIG. 16, lighting apparatus 200 includes base plate 210, a plurality of light emitting devices 100, two illumination surfaces 220a, and 220b, and top plate 230.

Base plate 210 is a rectangular plate composing the bottom face of lighting apparatus 200. On the other hand, top plate 230 is a rectangular plate composing the top face of lighting apparatus 200. Base plate 210 and top plate 230 reflect the light emitted from light emitting device 100 to thereby improve the brightness and illuminance distribution in lighting apparatus 200.

Light emitting devices 100 are disposed on base plate 210 in such a manner as to be aligned with a straight line in parallel with illumination surfaces 220a and 220b. Normally, light emitting devices 100 are disposed in such a manner that center-to-center distances P of light emitting devices 100 have the same value (see FIG. 16). Light emitting devices 100 are each disposed in such a manner that the xz plane in the three-dimensional orthogonal coordinate system is in parallel with illumination surfaces 220a and 220b.

Illumination surfaces 220a and 220b are rectangular plates composing the side faces of lighting apparatus 200. Illumination surfaces 220a and 220b are disposed facing each other in parallel with the xz plane of light emitting device 100. For example, advertisement characters and advertisement illustrations and the like are drawn on illumination surfaces 220a and 220b.

Lighting apparatus 200 is used by illuminating illumination surfaces 220a and 220b with light emitted from light emitting devices 100 disposed in lighting apparatus 200.

[Effect]

In light emitting device 100 of Embodiment 1, the distributions of light in the x-axis direction and the y-axis direction can be individually controlled by individually adjusting the x-directional curvature and the y-directional curvature of emission surface 123 in accordance with center-to-center distance P of light emitting devices 100 (see FIG. 16) and the distance between light emitting device 100 and the surface to be illuminated. Thus, in lighting apparatus 200 including light emitting device 100, illumination surfaces 220a and 220b can be uniformly illuminated, while almost no bright site 40 and shining site 50 (see FIG. 14).

Figure 17:
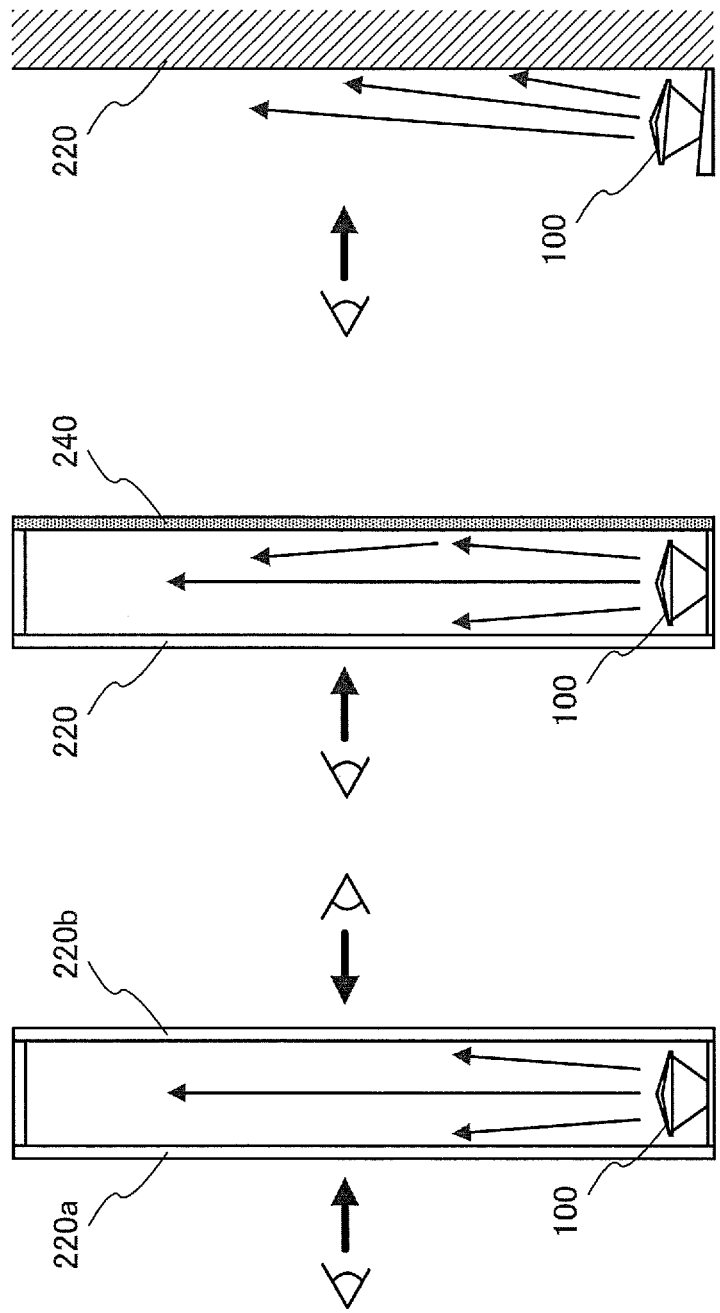
FIG. 17A is a sectional view illustrating an exemplary double-side type internal illumination lighting apparatus.
FIG. 17B is a sectional view illustrating an exemplary one-side type internal illumination lighting apparatus.
FIG. 17C is a sectional view illustrating an exemplary externally illuminating lighting apparatus.

It is to be noted that, while an exemplary internal illumination lighting apparatus having two illumination surfaces 220a and 220b has been described in the above description, the lighting apparatus of the embodiment of the present invention is not limited to this. The lighting apparatus of the embodiment of the present invention may be a double-side type internal illumination lighting apparatus having two illumination surfaces 220a and 220b illustrated in FIG. 17A, or a one-side type internal illumination lighting apparatus having one illumination surface 220 illustrated in FIG. 17B. In the latter case, the surface facing illumination surface 220 is preferably reflecting surface 240. Further, the lighting apparatus of the embodiment of the present invention may be an externally illuminating lighting apparatus illustrated in FIG. 17C. In any of the modes, light emitting device 100 is disposed in such a manner that the x axis of the three-dimensional orthogonal coordinate system is in parallel with illumination surface 220.

Embodiment 2

[Configuration of Light Emitting Device]

Figure 18:
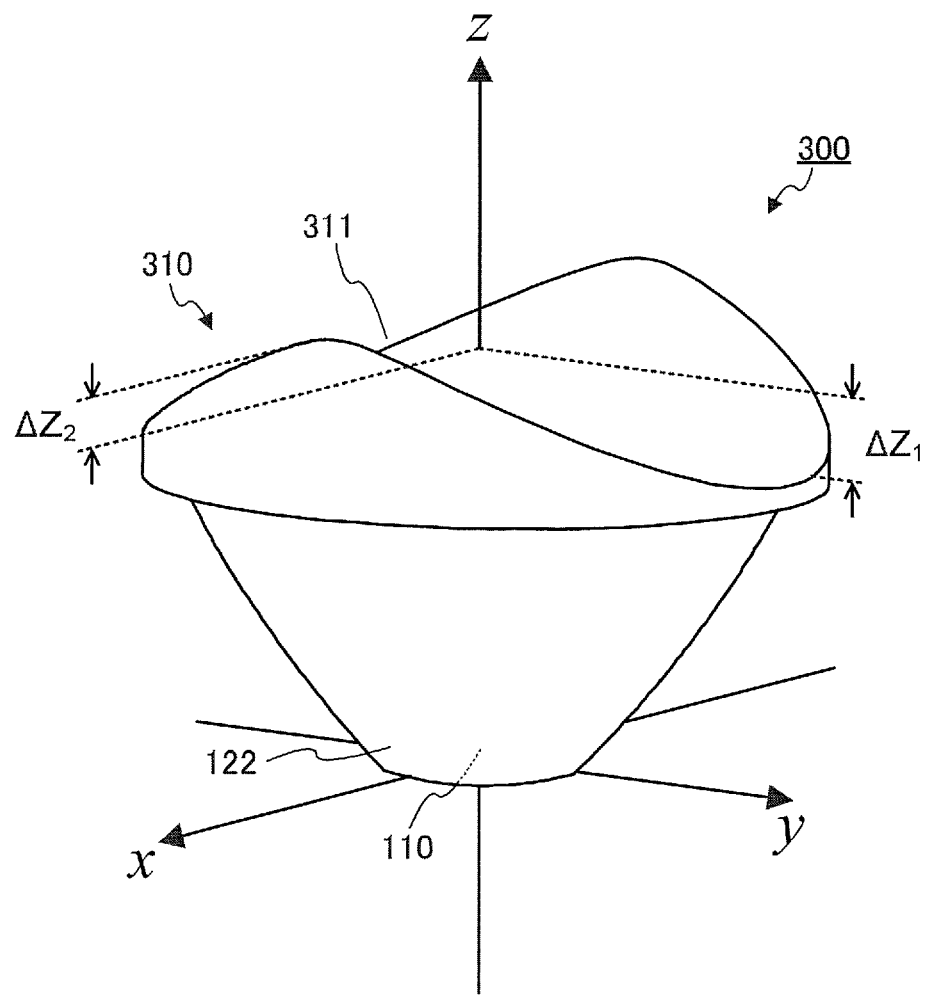
FIG. 18 is a perspective view of a light emitting device of Embodiment 2.

FIGS. 18 to 21 each illustrate the configuration of a light emitting device of Embodiment 2 of the present invention. FIG. 18 is a perspective view of the light emitting device of Embodiment 2. FIG. 19A is a front view of the light emitting device of Embodiment 2 and FIG. 19B is a side view of the light emitting device of Embodiment 2. FIG. 20A is a plan view of the light emitting device of Embodiment 2 and FIG. 20B is a bottom view of the light emitting device of Embodiment 2. FIG. 21A is a sectional view taken along the line A-A of FIG. 19A and FIG. 21B is a sectional view taken along the line B-B of FIG. 19B. It is to be noted that the same components as those of light emitting device 100 of Embodiment 1 illustrated in FIGS. 4 to 7 will be denoted by the same reference numerals and description thereof will be omitted.

As illustrated in FIGS. 18 to 21, light emitting device 300 of Embodiment 2 includes light emitting element 110 and light flux controlling member 310. Light flux controlling member 310 is disposed in such a manner that central axis CA thereof matches the optical axis of light emitting element 110. The following description will be made on the assumption that light flux controlling member 310 is disposed in a three-dimensional orthogonal coordinate system, as in Embodiment 1.

Figure 21A:
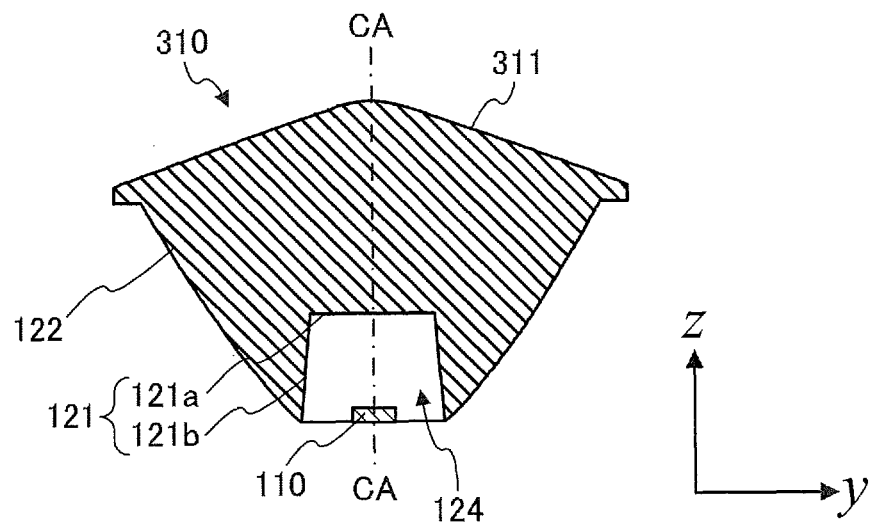
FIG. 21A is a sectional view taken along the line A-A of FIG. 19A.
Figure 21B:
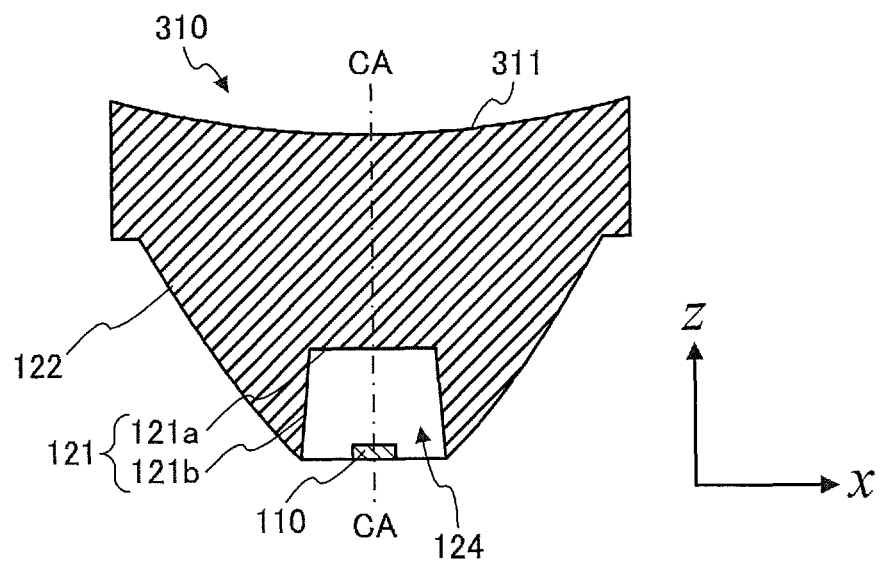
FIG. 21B is a sectional view taken along the line B-B of FIG. 19B.

As illustrated in FIGS. 21A and 21B, light flux controlling member 310 includes incidence surface 121 on which light emitted from light emitting element 110 in incident, total reflection surface 122 that totally reflects part of light incident on incidence surface 121, and emission surface 311 that emits part of light incident on incidence surface 121 and light reflected by total reflection surface 122. Light flux controlling member 310 of Embodiment 2 differs from light emitting device 100 of Embodiment 1 in only the form of emission surface 311. Therefore the form of emission surface 311 will be described with reference to FIGS. 18 to 21B.

In light flux controlling member 310 of Embodiment 2, emission surface 311 has a saddle-like form (saddle form). As with light flux controlling member 110 of Embodiment 1, in light flux controlling member 310 of Embodiment 2, the form of emission surface 311 satisfies the following Expression (1) and Expression (2).

$$\Delta Z_1 > \Delta Z_2 \tag{1}$$

$$\Delta Z_2 \neq 0 \tag{2}$$

Figure 19A:
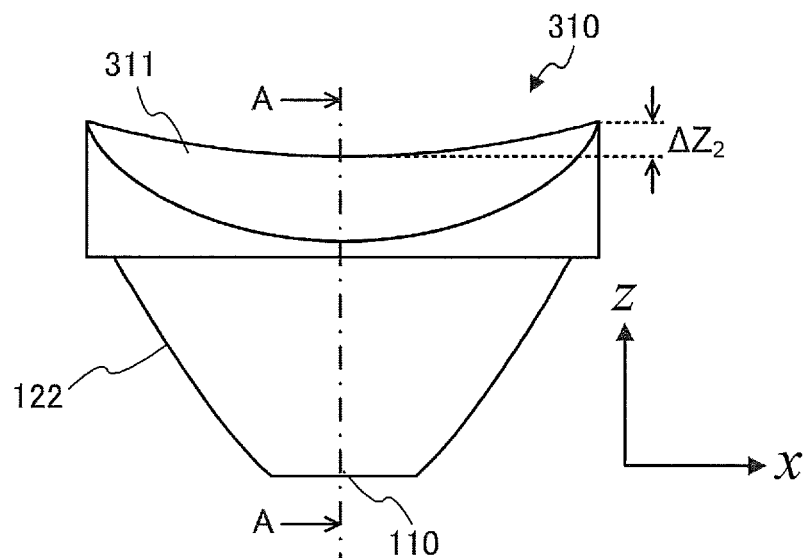
FIG. 19A is a front view of the light emitting device of Embodiment 2.
Figure 19B:
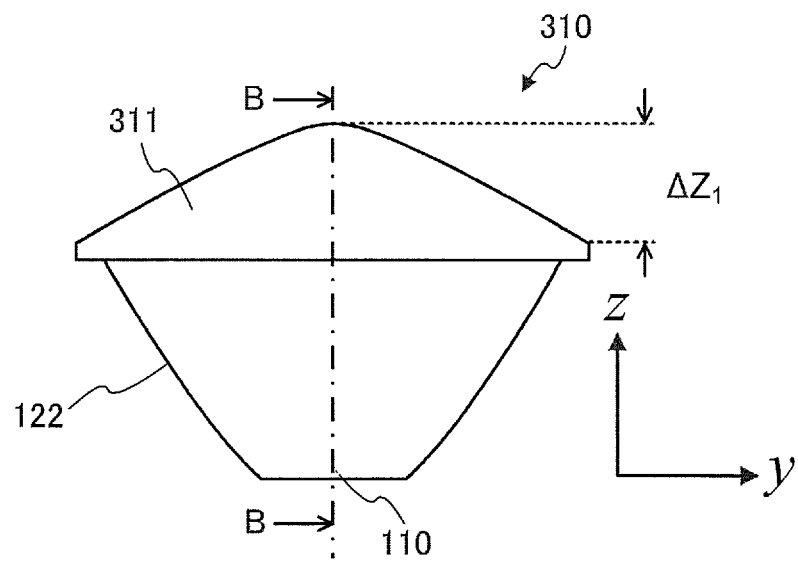
FIG. 19B is a side view of the light emitting device of Embodiment 2.
Figure 20A:
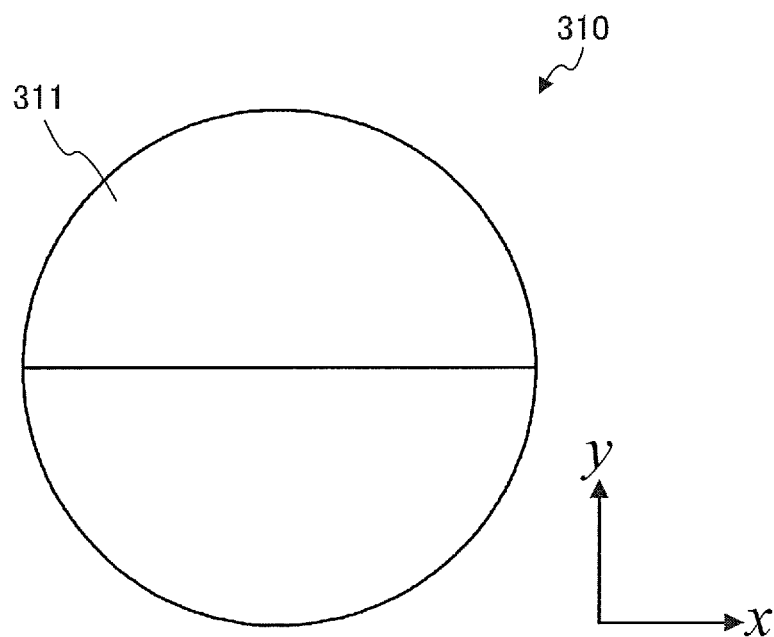
FIG. 20A is a plan view of the light emitting device of Embodiment 2.
Figure 20B:
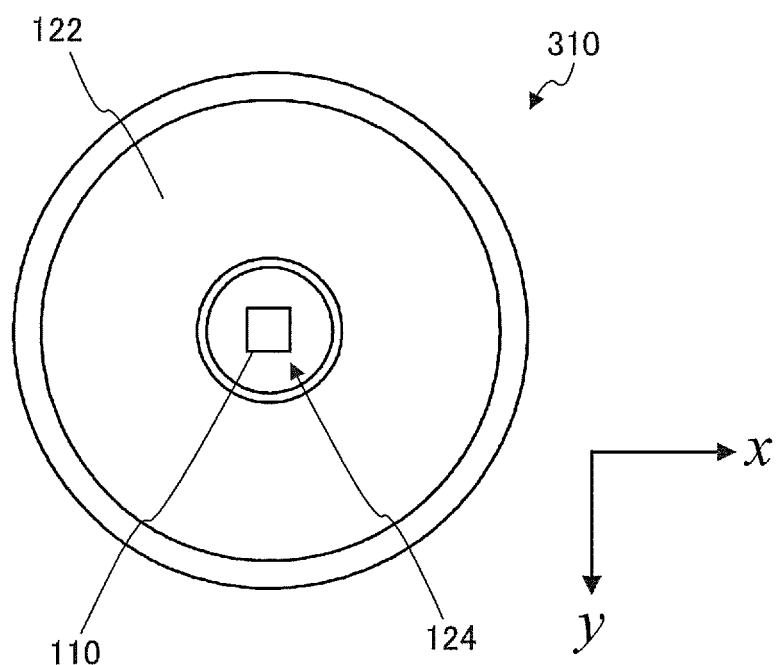
FIG. 20B is a bottom view of the light emitting device of Embodiment 2.

In Expression (1) and Expression (2), $\Delta Z_1$ represents a value obtained by subtracting the z-coordinate value of the point which has the maximum y-coordinate value on emission surface 311, from the z-coordinate value of the intersection of central axis CA (the z axis) of light flux controlling member 310 with emission surface 311. In other words, as illustrated in FIG. 18 and FIG. 19B, $\Delta Z_1$ represents a variation of the z-coordinate on emission surface 311 relative to the y-axis direction. In light flux controlling member 310 of Embodiment 2, $\Delta Z_1$ is a positive value.

In addition, in Expression (1) and Expression (2), $\Delta Z_2$ represents a value obtained by subtracting the z-coordinate value of the point which has the maximum x-coordinate value on emission surface 311, from the z-coordinate value of the intersection (the vertex of emission surface 311) of central axis CA (the z axis) of light flux controlling member 310 with emission surface 311. In other words, as illustrated in FIG. 18 and FIG. 19A, $\Delta Z_2$ represents a variation of the z-coordinate on emission surface 311 relative to the x-axis direction. In light flux controlling member 310 of Embodiment 2, emission surface 311 has a saddle form, and therefore $\Delta Z_2$ is a negative value. As described above, light flux controlling member 310 is disposed in the three-dimensional orthogonal coordinate system in such a manner that $\Delta Z_2$ has the minimum value (see FIG. 18).

Expression (2) means that emission surface 311 has a curvature in a cross-section (the xz plane) at y=0 (see FIG. 19A). In the case of a light flux controlling member having an emission surface of a substantially cylindrical form, $\Delta Z_2=0$ is satisfied. Accordingly, when Expression (2) is satisfied, emission surface 311 of light flux controlling member 310 does not have a substantially cylindrical form.

In addition, Expression (1) means that the curvature of emission surface 311 in the cross-section (the yz plane) at x=0 differs from the curvature of emission surface 311 in the cross-section (the xz plane) at y=0 (see and compare FIG. 19A with FIG. 19B). In the case of the light flux controlling member having a rotationally symmetrical emission surface, $\Delta Z_1=\Delta Z_2$ is satisfied. Accordingly, when Expression (2) is satisfied, emission surface 311 of light flux controlling member 310 does not have a rotationally symmetrical form.

As illustrated in FIG. 18, emission surface 311 of light flux controlling member 310 has a saddle form. The "saddle form" herein is a form which is plane-symmetrical to the xz plane and has a curvature in both of the x-axis direction and the y-axis direction, wherein the curvature center of the x-directional curvature is located on the positive side of the z axis relative to emission surface 311 whereas the curvature center of the y-directional curvature is located on the negative side of the z axis relative to emission surface 311.

When $R_a$ represents the curvature radius of emission surface 311 in the cross-section (the xz plane) at y=0, and $R_b$ represents the curvature radius of emission surface 311 in the cross-section (any plane in parallel with the xz plane) at y≠0, $R_a$ and $R_b$ may either be the same value, or different values. In both cases, the distributions of light in the x-axis direction and the y-axis direction can be precisely controlled by individually adjusting the curvature radiuses $R_a$ and $R_b$ in accordance with the positional relationship between light emitting device 300 and the surface to be illuminated.

[Effect]

As with light emitting device 100 of Embodiment 1, light emitting device 300 of Embodiment 2 can control the distributions of light in the x-axis direction and the y-axis direction to thereby uniformly illuminate the surface to be illuminated.

Thus, the lighting apparatus including light emitting device 300 can make the illuminance distribution on the illuminated surface more uniform.

Embodiment 3

[Configuration of Light Emitting Device]

Figure 22:
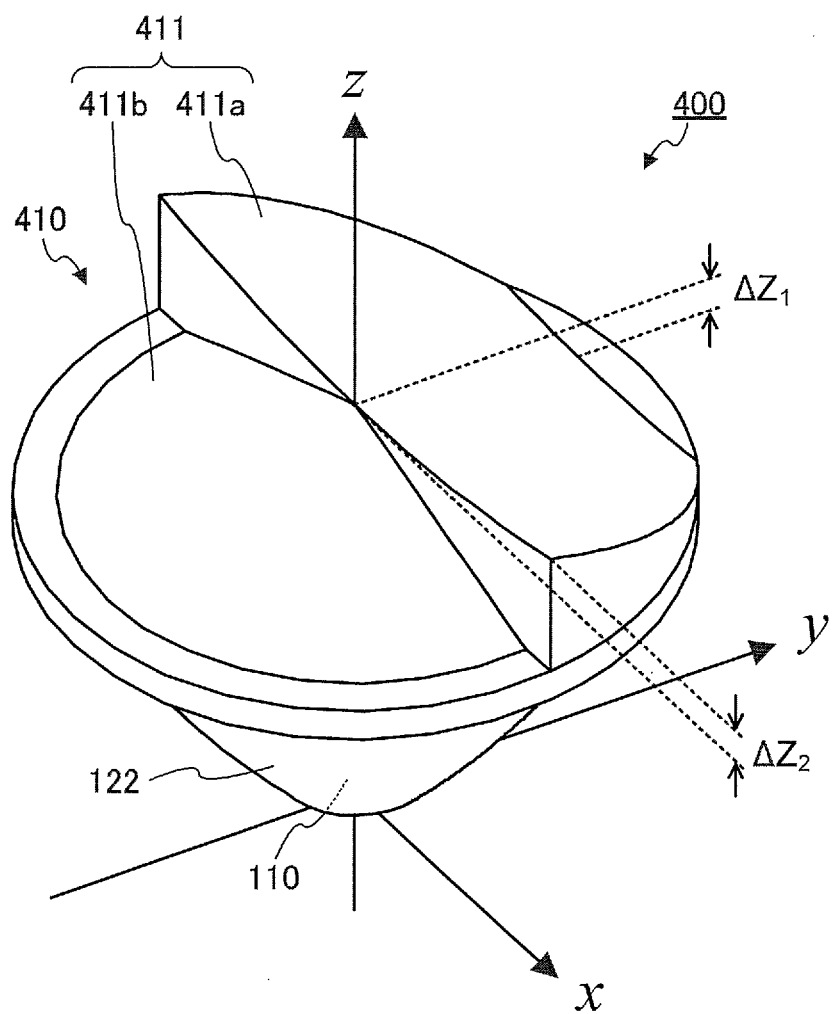
FIG. 22 is a perspective view of a light emitting device of Embodiment 3.
Figure 23A:
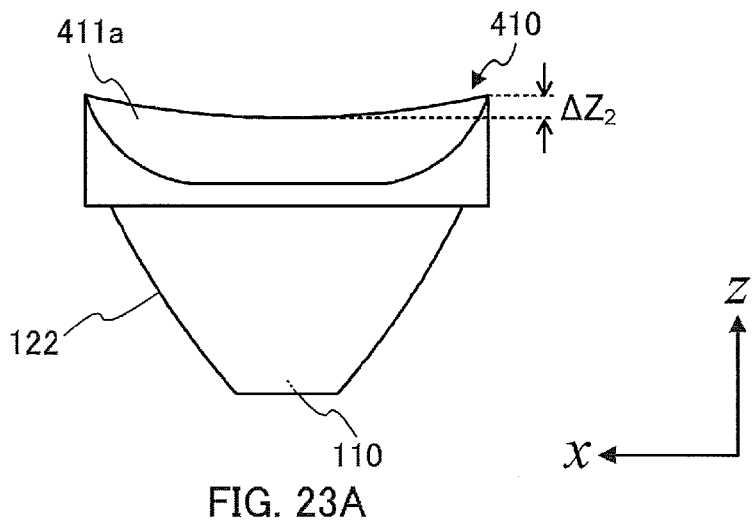
FIG. 23A is a front view of the light emitting device of Embodiment 3.
Figure 23B:
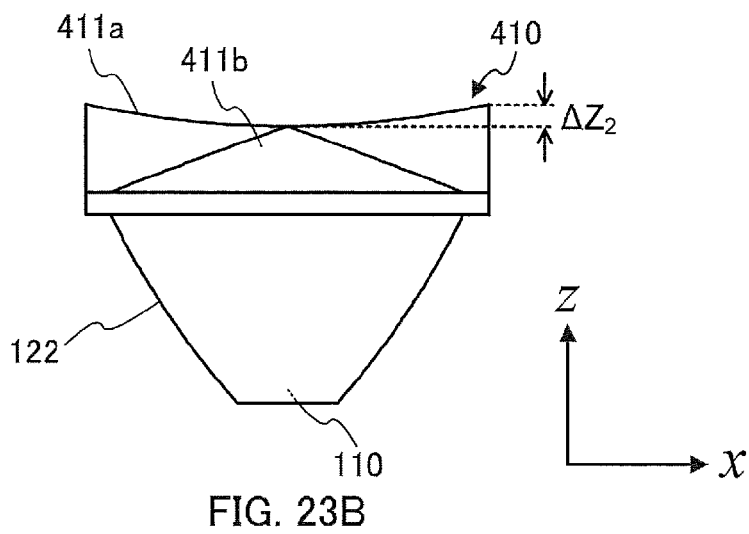
FIG. 23B is a back view of the light emitting device of Embodiment 3.
Figure 23C:
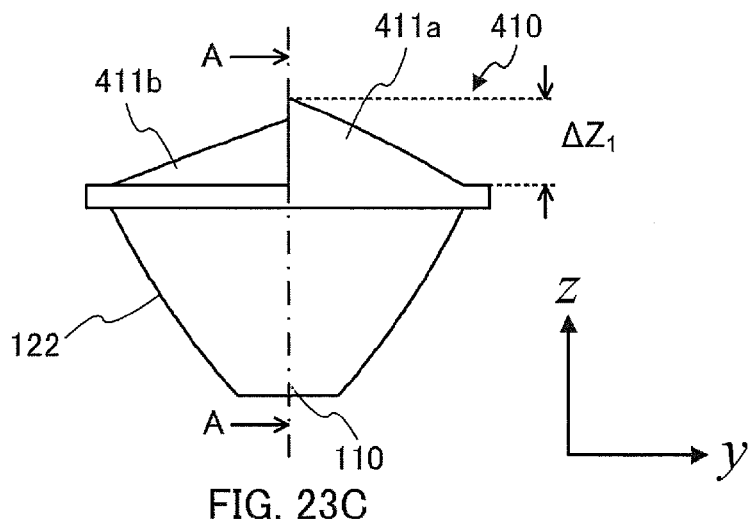
FIG. 23C is a side view of the light emitting device of Embodiment 3.
Figure 24A:
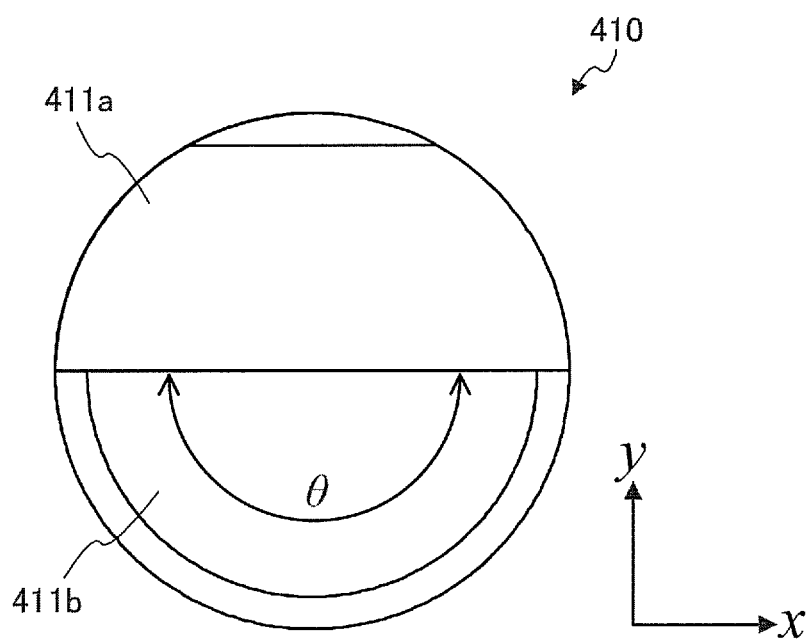
FIG. 24A is a plan view of the light emitting device of Embodiment 3.
Figure 24B:
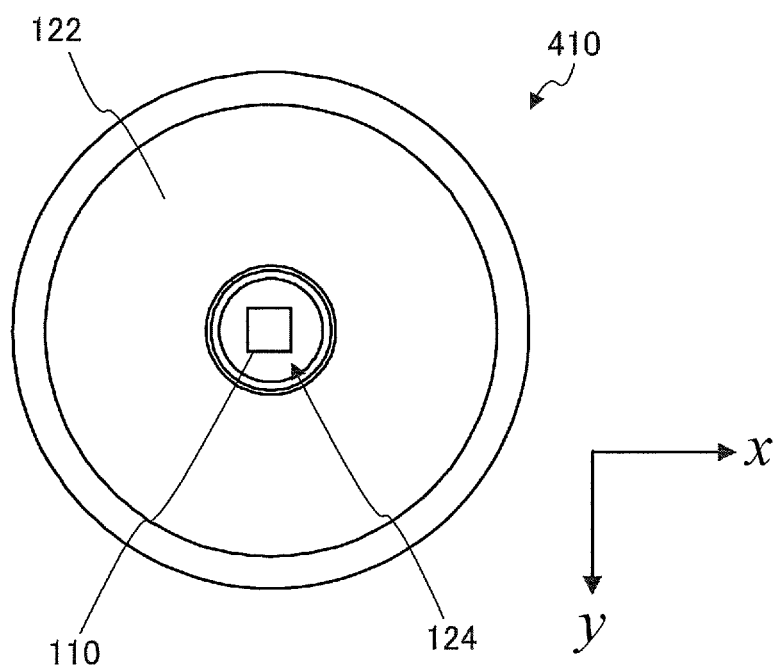
FIG. 24B is a bottom view of the light emitting device of Embodiment 3.
Figure 25:
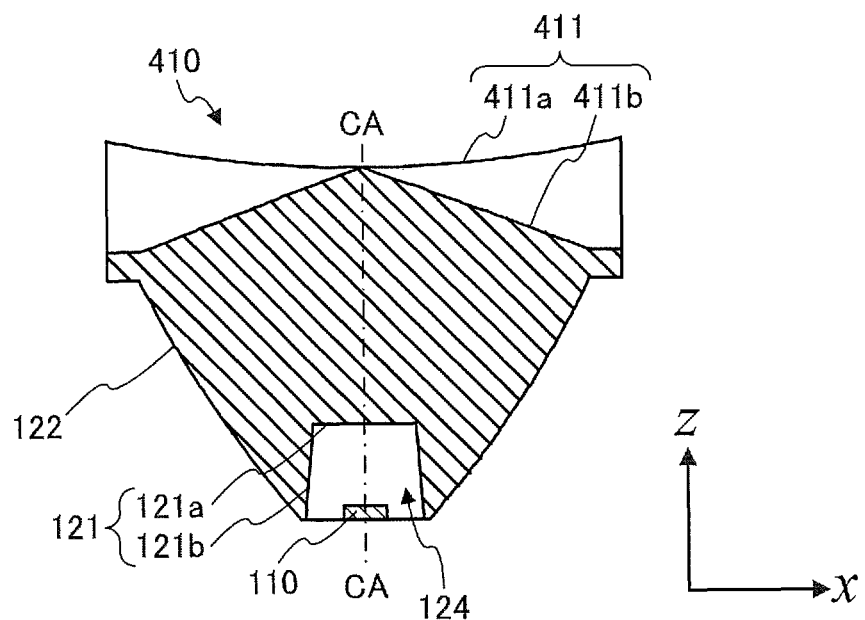
FIG. 25 is a sectional view taken along the line A-A of FIG. 23C.

FIGS. 22 to 25 illustrate the configuration of a light emitting device of Embodiment 3 of the present invention. FIG. 22 is a perspective view of the light emitting device of Embodiment 3. FIG. 23A is a front view of the light emitting device of Embodiment 3, FIG. 23B is a back view of the light emitting device of Embodiment 3 and FIG. 23C is a side view of the light emitting device of Embodiment 3. FIG. 24A is a plan view of the light emitting device of Embodiment 3 and FIG. 24B is a bottom view of the light emitting device of Embodiment 3. FIG. 25 is a sectional view taken along the line A-A of FIG. 23C. It is to be noted that the same components as those of light emitting device 100 of Embodiment 1 illustrated in FIGS. 4 to 7B and light emitting device 300 of Embodiment 2 illustrated in FIGS. 18 to 21 are denoted by the same reference numerals and the descriptions thereof are omitted.

As illustrated in FIGS. 22 to 25, light emitting device 400 of Embodiment 3 includes light emitting element 110 and light flux controlling member 410. Light flux controlling member 410 is disposed in such a manner that central axis CA thereof matches the optical axis of light emitting element 110. As in Embodiments 1 and 2, the following descriptions will be made on the assumption that light flux controlling member 410 is disposed in a three-dimensional orthogonal coordinate system.

As illustrated in FIGS. 22 and 25, light flux controlling member 410 includes incidence surface 121 on which light emitted from light emitting element 110 is incident, total reflection surface 122 that totally reflects part of light incident on incidence surface 121, and emission surface 411 that emits part of light incident on incidence surface 121 and light reflected by total reflection surface 122. Light flux controlling member 410 of Embodiment 3 differs from light emitting device 100 of Embodiment 1 and light emitting device 300 of Embodiment 2 in only the form of emission surface 311. Therefore the form of emission surface 411 will be described with reference to FIGS. 22 to 25.

In light flux controlling member 410 of Embodiment 3, emission surface 411 includes two emission surfaces (first emission surface 411a and second emission surface 411b) which have different forms. First emission surface 411a has a form (saddle foHn) same as a part of emission surface 311 of light flux controlling member 310 of Embodiment 2. Accordingly, first emission surface 411a satisfies the following Expression (1) and Expression (2) as with emission surface 311.

$$\Delta Z_1 > \Delta Z_2 \quad (1)$$

$$\Delta Z_2 \neq 0 \quad (2)$$

On the other hand, second emission surface 411b is a part of a conical surface formed by rotating the generatrix about central axis CA of light flux controlling member 410 as the rotational axis.

As illustrated in FIG. 22, in emission surface 414, second emission surface 411b corresponds to a part or all of the region included in the space of y<0 in the three-dimensional orthogonal coordinate system. On the other hand, in emission surface 411, first emission surface 411a corresponds to all the regions included in the space of y≥0 in the three-dimensional orthogonal coordinate system. Accordingly, in emission surface 411, the site having the maximum y-coordinate value and the site having the maximum x-coordinate value are both located in first emission surface 411a. As described above, first emission surface 411a satisfies Expression (1) and Expression (2), and thus, emission surface 411 in its entirety satisfies Expression (1) and Expression (2).

It is to be noted that, in a plan view of light flux controlling member 410, angle θ, relative to central axis CA of light flux controlling member 410, in which second emission surface 411b is defined (see FIG. 24A) is not specifically limited as long as angle θ falls within the range 0°<θ<180°. In the example illustrated in FIG. 24A, angle θ is θ≈180° (θ<180°), but angle θ may be, for example, θ=90°.

[Effect]

In light flux controlling member 410 of Embodiment 3, first emission surface 411a expands light in the x-axis direction and the y-axis direction, and second emission surface 411b collects light. Thus, light flux controlling member 410 of Embodiment 3 can adjust the balance between wide distribution of light and light collection by adjusting the ratio of second emission surface 411b in emission surface 411. Thus, a lighting apparatus having light flux controlling member 410 can make the illuminance distribution on the illuminated surface more uniform.

This application is entitled to and claims the benefit of Japanese Patent Application No. 2011-237174 filed on Oct. 28, 2011, and Japanese Patent Application No. 2012-063533 filed on Mar. 21, 2012, the disclosure each of which including the specification, drawings and abstract is incorporated herein by reference in its entirety.

INDUSTRIAL APPLICABILITY

The light emitting device and lighting apparatus according to the embodiments of the present invention are applicable to internal illumination signboards, externally illuminating signboards, and indirect lighting apparatuses, for example.

REFERENCE SIGNS LIST

10 Illumination Surface
20 Light emitting device
30 Base plate
40 Bright site
50 Shining site
100, 300, 400 Light emitting device
110 Light emitting element
120, 310, 410 Light flux controlling member
121 Incidence surface
121a Internal top surface
121b Internal surface
122 Total reflection surface
123, 311, 411 Emission surface
124 Recess
200 Lighting apparatus
210 Base plate
220, 220a, 220b Illumination surface
230 Top plate
240 Reflecting surface
411a First emission surface
411b Second emission surface
CA Central axis

The invention claimed is:

1. A light flux controlling member that controls a distribution of light emitted from a light emitting element, the light flux controlling member comprising:

an incidence surface on which light emitted from the light emitting element is incident;
a total reflection surface that totally reflects part of the light incident on the incidence surface; and
an emission surface that emits the part of the light incident on the incidence surface and the light reflected by the total reflection surface, wherein
the incidence surface is so formed as to face the light emitting element and to intersect with a central axis of the light flux controlling member,
the emission surface is so formed as to face away from the incidence surface and to intersect with the central axis of the light flux controlling member,
the total reflection surface is so formed as to surround the central axis of the light flux controlling member and to have a diameter that gradually increases from a side of the incidence surface toward a side of the emission surface, and,
when the light flux controlling member is disposed in a three-dimensional orthogonal coordinate system in such a manner that a light emission center of the light emitting element is located at an origin, that the central axis of the light flux controlling member corresponds to a z axis, and that a direction in which light travels from the light emission center of the light emitting element toward the emission surface is a forward direction of the z axis, the emission surface satisfies the following Expression (1) and Expression (2)

$$\Delta Z_1 > \Delta Z_2 \qquad (1)$$

$$\Delta Z_2 \neq 0 \qquad (2)$$

where $\Delta Z_1$ represents a value obtained by subtracting a z-coordinate value of a point which has a maximum y-coordinate value on the emission surface from a z-coordinate value of an intersection of the central axis of the light flux controlling member with the emission surface, and $\Delta Z_2$ represents a value obtained by subtracting a z-coordinate value of a point which has a maximum x-coordinate value on the emission surface from the z-coordinate value of the intersection of the central axis of the light flux controlling member with the emission surface, the light flux controlling member being disposed in the three-dimensional orthogonal coordinate system in such a manner that $\Delta Z_2$ has a minimum value.

2. The light flux controlling member according to claim 1, wherein
the emission surface has a ridge line on a xz plane in the three-dimensional orthogonal coordinate system, and
in any cross-section in parallel with the xz plane in the three-dimensional orthogonal coordinate system, the emission surface has a curvature, and satisfies $R_1 = R_2$ where $R_1$ represents a curvature radius of the emission surface at x=0, and $R_2$ represents a curvature radius of the emission surface at any point of x≠0.

3. The light flux controlling member according to claim 2, wherein,
in the three-dimensional orthogonal coordinate system, the emission surface satisfies $x_1 = x_2 = 0$ and $z_1 = z_2$ where a coordinate of a curvature center $O_1$ of the emission surface in a cross-section in parallel with a xz plane at y=0 is represented by $(x_1, y_1, z_1)$, and a coordinate of a curvature center $O_2$ of the emission surface in a cross-section in parallel with a xz plane at y≠0 is represented by $(x_2, y_2, z_2)$.

4. The light flux controlling member according to claim 2, wherein, in the three-dimensional orthogonal coordinate system, the emission surface satisfies $x_1=x_2=0$ and $z_1 \neq z_2$ where a coordinate of a curvature center $O_1$ of the emission surface in a cross-section in parallel with a xz plane at $y=0$ is represented by $(x_1, y_1, z_1)$, and a coordinate of a curvature center $O_2$ of the emission surface in a cross-section in parallel with a xz plane at $y \neq 0$ is represented by $(x_2, y_2, z_2)$.

5. The light flux controlling member according to claim 1, wherein the $\Delta Z_1$ and the $\Delta Z_2$ are each a positive value.

6. The light flux controlling member according to claim 1, wherein the $\Delta Z_1$ is a positive value, and
the $\Delta Z_2$ is a negative value.

7. The light flux controlling member according to claim 1, wherein, in a space of $y<0$ in the three-dimensional orthogonal coordinate system, the emission surface includes a part of a conical surface which is obtained by rotating a generatrix about the central axis of the light flux controlling member as a rotational axis.

8. A light emitting device comprising:

the light flux controlling member according to any one of claims 1 through 7; and
a light emitting element, wherein
the light flux controlling member is disposed in such a manner that a central axis of the light flux controlling member matches an optical axis of the light emitting element.

9. A lighting apparatus comprising:

the light emitting device according to claim 8; and
a planar surface to be illuminated by light from the light emitting device, wherein
the light emitting device is disposed in such a manner that the x axis in the three-dimensional orthogonal coordinate system is in parallel with the planar surface to be illuminated.

10. The lighting apparatus according to claim 9, wherein the light emitting device includes the plurality of light emitting devices, and the light emitting devices are aligned with a straight line in parallel with the surface to be illuminated.

* * * * *